US00RE48813E

(19) United States
(12) Reissued Patent
Funase et al.

(10) Patent Number: US RE48,813 E
(45) Date of Reissued Patent: Nov. 9, 2021

(54) WEARABLE TERMINAL AND CONTROL METHOD

(71) Applicant: PANASONIC INTELLECTUAL PROPERTY CORPORATION OF AMERICA, Torrance, CA (US)

(72) Inventors: Kazuki Funase, Osaka (JP); Tetsuji Fuchikami, Osaka (JP); Akinori Ozeki, Osaka (JP); Hideshi Aoki, Osaka (JP)

(73) Assignee: PANASONIC INTELLECTUAL PROPERTY CORPORATION OF AMERICA, Torrance, CA (US)

(21) Appl. No.: 16/902,903

(22) Filed: Jun. 16, 2020

Related U.S. Patent Documents

Reissue of:
(64) Patent No.: 10,126,838
Issued: Nov. 13, 2018
Appl. No.: 15/344,643
Filed: Nov. 7, 2016

(30) Foreign Application Priority Data

Nov. 19, 2015 (JP) ..... 2015-227042

(51) Int. Cl.

| | |
|---|---|
| ***G09G 5/00*** | (2006.01) |
| ***G06F 3/0346*** | (2013.01) |
| ***G06F 1/16*** | (2006.01) |
| ***G06F 3/01*** | (2006.01) |
| ***G06F 3/0484*** | (2013.01) |

(Continued)

(52) U.S. Cl.
CPC ..... *G06F 3/0346* (2013.01); *G04C 3/002* (2013.01); *G06F 1/163* (2013.01); *G06F 1/1694* (2013.01); *G06F 3/017* (2013.01); *G06F 3/0485* (2013.01); *G06F 3/0487* (2013.01); *G06F 3/04845* (2013.01); *G06F 2200/1637* (2013.01); *G06F 2203/04803* (2013.01)

(58) Field of Classification Search
CPC ..... G06F 3/0346; G06F 1/163; G06F 3/017; G06F 3/4845; G06F 2203/04803
See application file for complete search history.

(56) References Cited

U.S. PATENT DOCUMENTS 8,896,526 B1 * 11/2014 Park ..... G06F 1/163 345/156
9,484,066 B2 * 11/2016 Ko ..... G11B 27/034
(Continued)

FOREIGN PATENT DOCUMENTS

JP 2010-277465 12/2010

*Primary Examiner* — Robert L Nasser
(74) *Attorney, Agent, or Firm* — Greenblum & Bernstein. P.L.C.

(57) ABSTRACT

A wearable terminal includes: a body having a display that performs display, a sensor that detects a first angle of rotation by which the display has been rotated with respect to a first axis as an axis of rotation, and a controller that controls the display according to the first angle of rotation; and a band that is connected to the body and extends around the forearm in an arcuate shape, wherein the first axis is perpendicular to a second axis and is parallel to a direction in which the forearm extends, when the first angle of rotation is within a first angle range, the controller causes a first display image displayed, and when the first angle of rotation changes the first angle range to a second angle range, the controller causes a part of the first display image and a part of a second display image simultaneously displayed.

24 Claims, 15 Drawing Sheets

(51) Int. Cl.

| | |
|---|---|
| ***G04C 3/00*** | (2006.01) |
| ***G06F 3/0485*** | (2013.01) |
| ***G06F 3/0487*** | (2013.01) |

(56) References Cited

U.S. PATENT DOCUMENTS

| | | | | |
|---|---|---|---|---|
| 9,594,443 | B2 * | 3/2017 | VanBlon | G06F 3/03545 |
| 9,703,384 | B2 * | 7/2017 | Kita | G06F 3/0346 |
| 2011/0059769 | A1 * | 3/2011 | Brunolli | G08C 17/02 455/556.1 |
| 2014/0157163 | A1 * | 6/2014 | Strutin-Belinoff | G06F 3/04883 715/769 |
| 2014/0160078 | A1 * | 6/2014 | Seo | G06F 11/3058 345/175 |
| 2015/0172238 | A1 * | 6/2015 | Ahmed | H04N 21/4788 709/217 |
| 2015/0186024 | A1 * | 7/2015 | Hong | G06F 9/542 715/800 |
| 2016/0003623 | A1 * | 1/2016 | Venkatraman | H04W 76/10 |
| 2016/0041620 | A1 * | 2/2016 | Motoyama | H04N 5/4403 345/156 |
| 2016/0283808 | A1 * | 9/2016 | Oganezov | G06K 9/00885 |
| 2017/0003747 | A1 * | 1/2017 | Carceroni | G06F 1/3215 |
| 2017/0010674 | A1 * | 1/2017 | Ide | G06F 3/017 |
| 2017/0034333 | A1 * | 2/2017 | Vishwanath | H04M 1/72527 |
| 2017/0041309 | A1 * | 2/2017 | Ekambaram | G06F 21/64 |
| 2017/0097715 | A1 * | 4/2017 | Kim | H04M 1/0266 |

* cited by examiner

WEARABLE TERMINAL AND CONTROL METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*NOTICE: More than one reissue application has been filed for the reissue of U.S. Pat. No. 10,126,838 B2. The present application is a Reissue Application of U.S. Pat. No. 10,126,838 B2. Reissue Application Ser. No. 17/094,179, filed Nov. 10, 2020, is also a Reissue Application of U.S. Pat. No. 10,126,838 B2.*

BACKGROUND

1. Technical Field

The present disclosure relates to a wearable terminal that detects a posture and switches display images according to the posture thus detected and a method for display control of such a wearable terminal.

2. Description of the Related Art

There has conventionally been disclosed an art directed to a portable terminal device that detects, with an acceleration sensor, a rotating operation that causes a housing of the device to rotate and changes display images in a case where the rotating operation thus detected has been detected.

However, the conventional art requires further improvement.

SUMMARY

In one general aspect, the techniques disclosed here feature a wearable terminal that is able to be worn on a forearm of a user, including: a body having a display that performs display, a sensor that detects a first angle of rotation by which the display has been rotated with respect to a first axis as an axis of rotation, and a controller that controls the display according to the first angle of rotation; and a band that is connected to the body and extends around the forearm in an arcuate shape, wherein the first axis is perpendicular to a second axis and is parallel to a direction in which the forearm extends, when the first angle of rotation is within a first angle range, the controller causes a first display image displayed, and when the first angle of rotation changes from the first angle range to a second angle range, the controller causes a part of the first display image and a part of a second display image simultaneously displayed.

The foregoing aspect makes it possible to achieve further improvement.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
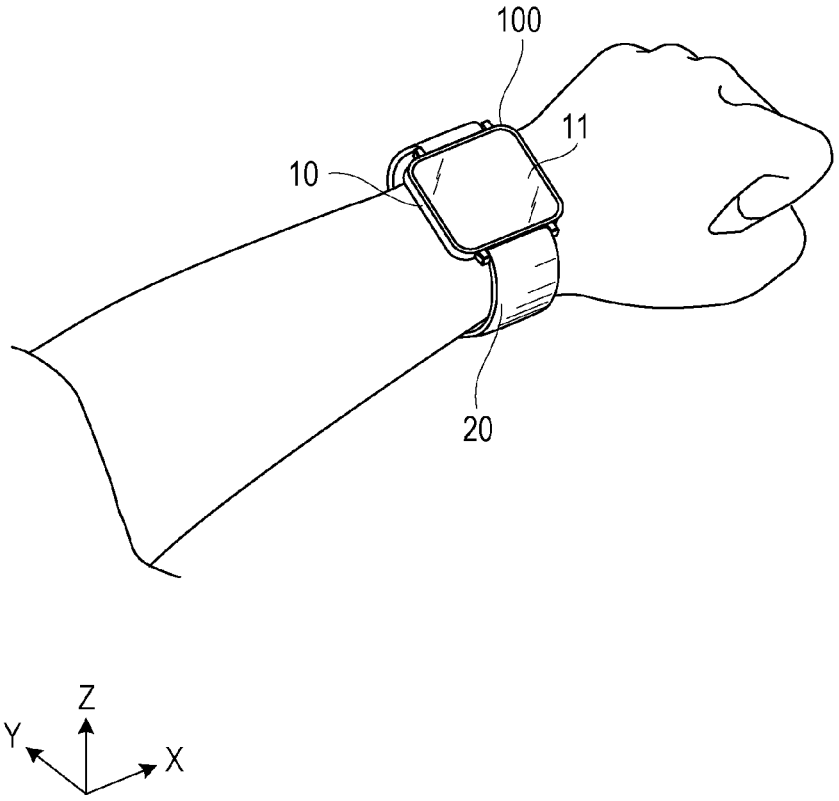
FIG. 1 is an appearance diagram of a wearable terminal according to Embodiment 1.

Underlying Knowledge Forming Basis of the Present Disclosure

The inventor of the present invention found that the portable terminal device described in sections "Description of the Related Art" has the following problems.

Japanese Unexamined Patent Application Publication No, 2010-277465 discloses a portable phone as a portable terminal device, and in recent years, a wearable terminal that is worn on a human body has been under development as a portable terminal device. An example of such a wearable terminal is a wristwatch-type wearable terminal that is worn on an arm.

Since such a wearable terminal is worn on one arm, the wearable terminal needs to be operated by a hand on the side of an arm opposite to the arm on which the wearable terminal is worn. Even in the case of a comparatively easy operation such as switching the wearable terminal's applications or switching from displaying one image to displaying another image, both arms are needed to operate the wearable terminal. For this reason, for example, in a case where one hand is busy, such as a case of carrying baggage or a case of hanging on to a strap in a train or bus, it is undesirably difficult to perform an operation on the wearable terminal.

In order to solve this problem, there has been a demand for causing the wearable terminal to perform display control according to a rotating operation by performing the rotating operation on the wearable terminal per se.

However, for example, even when display control is performed in which display images are switched in a case where the wearable terminal is rotated by a predetermined angle of rotation in a predetermined direction of rotation and then rotated in a direction opposite to the predetermined direction of rotation back to the original position, the user cannot confirm how he/she should rotate the wearable terminal to switch to the next display image. That is, the user can only confirm the result of having switched to the next display image. This undesirably makes the user unable to even know whether display images are switched, unless he/she knows in advance an operating method of rotating the wearable terminal to switch to the next display image.

Incidentally, the wearable terminal has a small housing and therefore only has a small space to store a battery. As such, the wearable terminal is undesirably less sufficient in battery capacity than other portable terminals such as smartphones. For this reason, a wearable terminal has been known which is brought into a sleep state when it is determined, by detecting the posture of the terminal per se, that the wearable terminal is in such a posture that the user is not viewing the wearable terminal. Specifically, a wearable terminal has been known which is brought into a sleep state by detecting a rotating operation performed on the terminal per se.

As mentioned above, in a case where the user does not know an operating method of rotating the wearable terminal to switch to the next display image, he/she needs to perform an operation with the hand on the side of the arm opposite to the arm on which the wearable terminal is worn. This requires the user to take time to switch display images, especially in a state where one hand is busy. Accordingly, with information kept displayed on the display, the wearable terminal waits for much more time than is necessary until an operation for switching display images is performed, thus ending up consuming electricity unnecessarily. Such an increase in power consumption is not desirable in the wearable terminal, which is small in battery capacity.

Further, as described above, the conventional wearable terminal has been known to perform either of the two processes, namely the process of switching display images and the process of switching to a sleep state, according to whether a predetermined rotating operation has been performed. However, no consideration has been given to how switching is performed in a case where the two processes are performed at the same time. That is, further consideration has been needed to cause the wearable terminal to perform the two processes, which differ in function from each other, by detecting a rotating operation.

Under such circumstances, the following measures were considered in order to improve the functions of a wearable terminal.

(1) A wearable terminal according to an aspect of the present disclosure is a wearable terminal that is able to be worn on a forearm of a user, including: a body having a display that performs display in a display area, a sensor that detects a first angle of rotation by which the display has been rotated with respect to a first axis as an axis of rotation, and a controller that controls the display according to the first angle of rotation; and a band that is connected to the body and extends around the forearm in an arcuate shape, wherein the first axis is perpendicular to a second axis and is parallel to a direction in which the forearm extends, the first axis forms, with the second axis, a plane that is parallel to a display surface of the display when the wearable terminal on the forearm of the user, when the first angle of rotation is within a first angle range, the controller causes a first display image to be displayed in the display area, and when the first angle of rotation changes from the first angle range to a second angle range that does not overlap with the first angle range, the controller causes at least part of the first display image and at least part of a second display image, that is different from the first display image, to be simultaneously displayed in the display area.

According to this, a transition from a state where the first display image is displayed to a state where the at least part of the first display image and the at least part of the second display image are displayed is made in a case where the first angle of rotation detected by the sensor of the wearable terminal has changed out of the first angle range into the second angle range. This allows the user to confirm a display image suggesting switching to the second display image, which is a display image that comes after the first display image. This allows the user to know how he/she should rotate the wearable terminal to switch to the next display image, thus allowing the user to easily switch to the next display image. This allows the user to switch display images without taking much time, thus allowing the wearable terminal to consume less electricity.

(2) In the aspect, when after the at least part of the first display image and the at least part of the second display image have been simultaneously displayed in the display area, the first angle of rotation changes from the second angle range to an angle range that may not overlap the second angle range, the controller may cause the second display image to be displayed in the display area and the first display image to not be displayed in the display area.

(3) In the aspect, when after the at least part of the first display image and the at least part of the second display image have been simultaneously displayed in the display area, the first angle of rotation changes from the second angle range to the first angle range, the controller may cause the second display image to be displayed in the display area and the first display image to not be displayed in the display area.

This allows the user to, by simply changing the first angle of rotation of the wearable terminal out of the second angle range into the first angle range in a state where the simultaneous display is performed, switch the display from displaying the first display image to displaying the second display image via the simultaneous display.

(4) In the aspect, the first display image may represent a first application that is executable in the wearable terminal, and the second display image may represent a second application that is different from the first application and is executable in the wearable terminal.

This allows the user to, by simply changing the first angle of rotation of the wearable terminal out of the second angle range into the first angle range, change from causing a display image representing the first application to be displayed in the display area to causing at least part of the display image representing the first application and at least part of a display image representing the second application to be simultaneously displayed in the display area.

(5) In the aspect, the sensor may further detect a second angle of rotation by which the display has been rotated with respect to the second axis as an axis of rotation, the controller may further control the display according to the second angle of rotation, when the second angle of rotation is within a third angle range and the first angle of rotation is within the first angle range, the controller may cause the first display image to be displayed in the display area, and when the second angle of rotation is within the third angle range and the first angle of rotation changes from the first angle range to the second angle range, the controller may cause the at least part of the first display image and the at least part of the second display image, that is different from the first display image, to be simultaneously displayed in the display area.

This allows the wearable terminal to switch display images on the display not only according to the first angle of rotation in the first direction of rotation but also according to the second angle of rotation in the second direction of rotation. This allows the controller to utilize a change in the second angle of rotation to switch to a display image that is different from the simultaneous display.

(6) In the aspect, the sensor may be a triaxial angular velocity sensor that further detects a third angle of rotation by which the display has been rotated with respect to a third axis as an axis of rotation, the third axis being perpendicular to the first axis and the second axis.

(7) In the aspect, the first angle range may be between −15 and 15 degrees when the display surface is assumed to be at 0 degrees when the display surface is parallel to a plane perpendicular to a direction of gravitational force and faces in a direction opposite to the direction of gravitational force, the second angle range may be between 15 degrees and 45 degrees when the display surface is assumed to be at 0 degrees when the display surface is parallel to a plane perpendicular to the direction of gravitational force and faces in a direction opposite to the direction of gravitational force and a positive direction of rotation is a direction in which forearm of the user turns so that the display surface faces farther away from the user's body, and the third angle range may be between 0 and 45 degrees when the display surface is assumed to be at 0 degrees when the display surface is parallel to a plane perpendicular to the direction of gravitational force and faces in a direction opposite to the direction of gravitational force and the positive direction of rotation is a direction in which the forearm of the user twists so that the display surface faces closer to the user's body.

This allows a user wearing the wearable terminal on his/her wrist to change the first angle of rotation, which is detected by the sensor of the wearable terminal, for example, by simply turning his/her forearm in such a direction that the wrist comes closer to his/her face. This allows the user to easily switch from a state where the first display image is displayed to the simultaneous display.

(8) In the aspect, the controller may turn off display on the display when the second angle of rotation changes to an angle range that does not overlap the third angle range.

This allows the wearable terminal not only to switch from the first display image to the simultaneous display according to a change in the first angle of rotation in the first direction of rotation but also to switch from the first display image or the simultaneous display to the turning off of display on the display according to a change in the second angle of rotation. This makes it possible to turn off display on the display, for example, in a case where the controller has determined, according to a result of detection performed by the sensor, that the user is in such a posture that the user is not viewing the display, thus making it possible to reduce power consumption. Further, by assigning the function of display control and the function of sleep control according to results of detection of the first and second angles of rotation about two different axes of rotation, respectively, the display control process and the sleep control process can be performed without confusion. This makes it possible to effectively achieve two different functions by detecting a rotating operation.

(9) In the aspect, the second angle range may include a fourth angle range and a fifth angle range and an angle of rotation from the fourth angle range to the first angle range is smaller than an angle of rotation from the fifth angle range to the first angle range, when the first angle of rotation changes from the fifth angle range to the first angle range, the controller may cause the second display image to be displayed in the display area and the first display image to not be displayed in the display area, and when the first angle of rotation changes from the fourth angle range to the first angle range, the controller may cause the first display image to be displayed in the display area and the second display image to not be displayed in the display area.

This allows different display images to be displayed after the simultaneous display, depending On whether the first angle of rotation fell within the fifth angle range, which is located further from the first angle range, of the second angle range before returning to the first angle range as a result of a rotation in a state where the simultaneous display is performed or the first angle of rotation fell within the fourth angle range, which is located closer to the first angle range, of the second angle range before returning to the first angle range as a result of a rotation in a state where the simultaneous display is performed. Further, in this case, when the first angle of rotation fell within the fifth angle range, which is located farther from the first angle range, switching from the simultaneous display to the second display image takes place, and when the first angle of rotation fell within the fourth angle range, which is located closer to the first angle range, switching to the first display image takes place instead of switching to the second display image. Thus, in a case where a rotation from a posture in which the first display image is displayed to the posture of simultaneous display is large, switching to the second display image takes place if the original posture is adopted as a result of a reverse rotation, and in a case where a rotation from a posture in which the first display image is displayed to the posture of simultaneous display is small, returning to the first display image takes place even if the original posture is adopted as a result of a reverse rotation. This allows the user to, by adjusting the degree of the angle by which a rotation is made, choose between switching to the second display image and switching to the first display image after having confirmed the simultaneous display.

(10) In the aspect, when the first angle of rotation changes from the fourth angle range to the fifth angle range, the at least part of the first display image and the at least part of the second display image may be simultaneously displayed in the display area and a third display image, suggesting switching from the first display image to the second display image, may be displayed in the display area.

This allows the user to know that the display image to be displayed in the case of returning to the first angle range next as a result of a rotation is the second display image, which comes after the first display image, as the third display image is displayed in a case where the first angle of rotation has changed into the fifth angle range. This allows the user to, after having confirmed the simultaneous display, easily determine whether switching to the second display image takes place or switching to the first display image takes place, thus allowing the user to choose between switching to the second display image and switching to the first display image.

(11) In the aspect, when the at least part of the first display image and the at least part of the second display image are simultaneously displayed in the display area and when the first angle of rotation is within the second angle range, the controller causes the at least pail o fate second display image to be displayed in a first display region of the display area and causes at least part of the first display image to be displayed in a second display region of the display area, the display area may be divided into to two regions by a boundary line that is perpendicular to the first axis, the first display region may be one of the two regions which is facing towards a body of the user, and the second display region may be the other of the two regions which is facing away from a body of the user.

For this reason, when the user performs an operation of switching from the simultaneous display to the second display image by changing out of the second angle range into the first angle range, the user can be given the sensation of pulling up the second display image, which is to be displayed next, from below and display it on the display.

(12) In the aspect, when the at least part of the first display image and the at least part of the second display image are simultaneously displayed in the display area and when the first angle of rotations is within the second angle range, the controller causes the at least part of the first display image to be displayed in a first display region of the display area and causes at least part of the second display image to be displayed in a second display region of the display area, the display area may be divided into the two regions by a boundary line that is parallel to the first axis, the first display region may be one of the two regions which is located on a fingertip side of the user, and the second display area may be the other of the two areas which is located on an elbow side of the user.

For this reason, when the user performs an operation of switching from the simultaneous display to the second display image by changing out of the second angle range into the first angle range, the user can be given the sensation of dropping the second display image, which is to be displayed next, in the direction of gravitational force and thereby display it on the display.

(13) A wearable terminal according to another aspect of the present disclosure is a wearable terminal that is able to be worn on a forearm of a user, including: a body having a display that performs display in a display area, a sensor that detects a first angle of rotation by which the display has been rotated with respect to a first axis as an axis of rotation, the first axis being parallel to a direction in which the forearm extends, and a controller that controls the display according to the first angle of rotation; and a band that is connected to the body and extends around the forearm an arcuate shape, wherein, when the first angle of rotation is within a first angle range, the controller causes a first display image to be displayed in the display area, and when the first angle of rotation changes from the first angle range to a second angle range that does not overlap the first angle range, the controller causes at least part of the first display image and at least part of a second display image, that is different from the first display image, to be simultaneously displayed in the display area.

According to this, a transition from a state where the first display image is displayed to a state where the at least part of the first display image and the at least part of the second display image are displayed is made in a case where the first angle of rotation detected by the sensor of the wearable terminal has changed out of the first angle range into the second angle range. This allows the user to confirm a display image suggesting switching to the second display image, which is a display image that comes after the first display image. This allows the user to know how he/she should rotate the wearable terminal to switch to the next display image, thus allowing the user to easily switch to the next display image. This allows the user to switch display images without taking much time, thus allowing the wearable terminal to consume less electricity.

(14) In the aspect, when after the at least part of the first display image and the at least part of the second display image have been simultaneously displayed in the display area, the first angle of rotation changes from the second angle range to an angle range that may not overlap the second angle range, the controller may cause the second display image to be displayed in the display area and the first display image to not be displayed in the display area.

(15) In the aspect, when rafter the at least part of the first display image and the at least part of the second display image have been simultaneously displayed in the display area, the first angle of rotation changes from the second angle range to the first angle range, the controller may cause the second display image to be displayed in the display area and the first display image to not be displayed in the display area.

This allows the user to, by simply changing the first angle of rotation of the wearable terminal out of the second angle range into the first angle range in a state where the simultaneous display is performed, sit itch the display from displaying the first display image to displaying the second display image via the simultaneous display.

(16) In the aspect, the first display image may represent a first application that is executable in the wearable terminal, and the second display image may represent a second application that is different from the first application and is executable ins the wearable terminal.

This allows the user to, by simply changing the first angle of rotation of the wearable terminal out of the second angle range into the first angle range, change from causing a display image representing the first application to be displayed in the display area to causing at least part of the display image representing the first application and at least part of a display image representing the second application to be simultaneously displayed in the display area.

(17) In the aspect, the sensor may further detect a second angle of rotation by which the display has been rotated with respect to a second axis as an axis of rotation, the second axis is perpendicular to the first axis and forms, with the first axis, a plane that is parallel to a display surface of the display when the user is wearing the wearable terminal on the forearm, the controller may further control the display according to the second angle of rotation, when the second angle of rotation is within a third angle range and the first angle of rotation is within the first angle range, the controller may cause the first display image to be displayed in the display area, and when the second angle of rotation is within the third angle range and the first angle of rotation changes from the first angle range to the second angle range, the controller may cause the at least part of the first display image and the at least part of the second display image, that different from the first display image, to be simultaneously displayed in the display area.

This allows the wearable terminal to switch display images on the display not only according to the first angle of rotation in the first direction of rotation but also according to the second angle of rotation in the second direction of rotation. This allows the controller to utilize a change in the second angle of rotation to switch to a display image that is different from the simultaneous display.

(18) In the aspect, the sensor may be a triaxial angular velocity sensor that further detects a third angle of rotation by which the display has been rotated with respect to a third axis as an axis of rotation, the third axis being perpendicular to the first axis and the second axis.

(19) In the aspect, the first angle range may be between −15 degrees and 15 degrees when the display surface of the display is assumed to be at 0 degrees when the display surface is parallel to a plane perpendicular to a direction of gravitational force and faces in a direction opposite to the direction of gravitational force, the second angle range may be between 15 degrees and 45 degrees a when the display surface is assumed to be at 0 degrees when the display surface is parallel to a plane perpendicular to the direction of gravitational force and faces in a direction opposite to the direction of gravitational force and a positive direction of rotation is a direction in which the forearm of the user turns so that the display surface faces farther away from the user's body, and the third angle range may be between 0 degree and 45 degrees when the display surface is assumed to be at 0 degrees when the display surface is parallel to a plane perpendicular to the direction of gravitational force and faces in a direction opposite to the direction of gravitational force and the positive direction of rotation is a direction in which the forearm of the user twists so that the display surface faces closer to the user's body.

This allows a user wearing the wearable terminal on his/her wrist to change the first angle of rotation, which is detected by the sensor of the wearable terminal, for example, by simply turning his/her forearm in such a direction that the wrist comes closer to his/her face. This allows the user to easily switch from a state where the first display image is displayed to the simultaneous display.

(20) In the aspect, the controller may turn off display on the display when the second angle of rotation changes to an angle range that does not overlap the third angle range.

This allows the wearable terminal not only to switch from the first display image to the simultaneous display according to a change in the first angle of rotation in the first direction of rotation but also to switch from the first display image or the simultaneous display to the turning off of display on the display according to a change in the second angle of rotation. This makes it possible to turn off display on the display, for example, in a case where the controller has determined, according to a result of detection performed by the sensor, that the user is in such a posture that the user is not viewing the display, thus making it possible to reduce power consumption. Further, by assigning the function of display control and the function of sleep control according to results of detection of the first and second angles of rotation about two different axes of rotation, respectively, the display control process and the sleep control process can be performed without confusion. This makes it possible to effectively achieve two different functions by detecting a rotating operation.

(21) In the aspect, the second angle range may include a fourth angle range and a fifth angle range and an angle of rotation from the fourth angle range to the first angle range is smaller than an angle of rotation from the fifth angle range to the first angle range, when the first angle of rotation changes from the fifth angle range to the first angle range, the controller may cause the second display image to be displayed in the display area and the first display image to not be displayed in the display area, and when the first angle of rotation changes from the fourth angle range to the first angle range, the controller may cause the first display image to be displayed in the display area and the second display image to not be displayed in the display area.

This allows different display images to be displayed after the simultaneous display, depending on whether the first angle of rotation fell within the fifth angle range, which is located farther from the first angle range, of the second angle range before returning to the first angle range as a result of a rotation in a state where the simultaneous display is performed or the first angle of rotation fell within the fourth angle range, which is located closer to the first angle range, of the second angle range before returning to the first angle range as a result of a rotation in a state where the simultaneous display is performed. Further, in this case, when the first angle of rotation fell within the fifth angle range, which is located farther from the first angle range, switching from the simultaneous display to the second display image takes place, and when the first angle of rotation fell within the fourth angle range, which is located closer to the first angle range, switching to the first display image takes place instead of switching to the second display image. Thus, in a case where a rotation from a posture in which the first display image is displayed to the posture of simultaneous display is large, switching to the second display image takes place if the original posture is adopted as a result of a reverse rotation, and in a case where a rotation from a posture in which the first display image is displayed to the posture of simultaneous display is small, returning to the first display image takes place even if the original posture is adopted as a result of a reverse rotation. This allows the user to, by adjusting the degree of the angle by which a rotation is made, choose between switching to the second display image and switching to the first display image after having confirmed the simultaneous display.

(22) In the aspect, when the first angle of rotation changes from the fourth angle range to the fifth angle range, the at least part of the first display image and the at least part of the second display image may be simultaneously displayed in the display area and a third display image suggesting switching from the first display image to the second display image may be displayed in the display area.

This allows the user to know that the display image to be displayed in the case of returning to the first angle range next as a result of a rotation is the second display image, which comes after the first display image, as the third display image is displayed in a case where the first angle of rotation has changed into the fifth angle range. This allows the user to, after having confirmed the simultaneous display, easily determine whether switching to the second display image takes place or switching to the first display image takes place, thus allowing the user to choose between switching to the second display image and switching to the first display image.

(23) In the aspect, when the at least part of the first display image and the at least part of the second display image are simultaneously displayed in the display area and when the first angle of rotation is within the second angle range, the controller causes the at least part of the second display image to be displayed in a first display region of the display area and causes at least part of the first display image to be displayed in a second display region of the display area, the display area may be divided into to two regions by a boundary line parallel to the forearm, the first display region may be one of the two regions which is located on a fingertip side of the user, and the second display region may be the other of the two regions which is located on at elbow side of the user.

For this reason, when the user performs an operation of switching from the simultaneous display to the second display image by changing out of the second angle range into the first angle range, the user can be given the sensations of pulling up the second display image, which is to be displayed next, from below and display it on the display.

(24) In the aspect, when the at least part of the first display image and the at least part of the second display image are simultaneously displayed in the display area and when the first angle of rotation is within the second angle range, the controller may cause the at least part of the first display image to be displayed in a first display region of the display area and cause at least part of the second display image to be displayed in a second display region of the display area, the display area may be divided into the two regions by a boundary line that is parallel to the forearm, the first display region may be one of the two regions which is located on a fingertip side of the user, and the second display area may be the other of the two areas which is located on an elbow side of the user.

For this reason, when the user performs an operation of switching from the simultaneous display to the second display image by changing out of the second angle range into the first angle range, the user can be given the sensation of dropping the second display image, which is to be displayed next, in the direction of gravitational force and thereby display it on the display.

(25) In the aspect, when, after the first angle of rotation changes front the second angle range into a sixth angle range that does not overlap the first angle range or the second angle range, the first angle of rotation changes from the sixth angle range to the first angle range, the controller may cause the first display image to be displayed in the display area and the second display image to not be displayed in the display area.

Further, in a case where the first angle of rotation detected by the sensor has changed out of the second angle range into the sixth angle range, which does not overlap the first angle range or the second angle range, and then changed out of the sixth angle range into the first angle range, the controller may cause the display to display the first display image and does not cause the display to the second display image.

(26) In the aspect, the second angle range may be an angle range between the first angle range and the sixth angle range.

Further, the second angle range may be an angle range provided between the first angle range and the sixth angle range.

It should be noted that these general or specific embodiments may be implemented as a system, a method, an integrated circuit, a computer program, a storage medium such as a computer-readable CD-ROM, or any selective combination thereof. Further, these general or specific embodiments may be implemented as a combination of some or all of the disclosures described in different embodiments.

A wearable terminal according to an aspect of the present disclosure and a method for display control of such a wearable terminal are described in detail below with reference to the drawings.

It should be noted that an embodiment described below is a specific example of the present disclosure. Numerical values, shapes, materials, constituent elements, and the locations and topology of the constituent elements, and the like that are shown in the embodiment below are examples, and are not intended to limit the present disclosure. Those of the constituent elements in the embodiment below which are not recited in an independent claim representing the most superordinate concept are described as optional constituent elements.

Embodiment 1

Embodiment 1 is described below with reference to FIGS. 1 to 10.

1-1. Configuration

In Embodiment 1, a wearable terminal is described which switches, according to a detected posture, from displaying one display image on a display to displaying another display image on the display.

FIG. 1 is an appearance diagram of a wearable terminal according to Embodiment 1.

As shown in FIG 1, the wearable terminal 100 is a wristwatch-type terminal that is worn on a user's arm like a wristwatch. The wearable terminal 100 includes a body 10 and a band 20.

The body 10 has a rectangular flat shape. The body 10 includes hardware for achieving a functional configuration of a display unit, a controller, and a sensor. The body 10 includes a display surface 11 that faces in a direction opposite to an arm in a state where the wearable terminal 100 is worn on the arm. The hardware configuration and the functional configuration will be described later. It should be noted that the body 10 may have an elliptical flat shape, a circular flat shape, or the like instead of having a rectangular flat shape. The body 10 is made, for example, of metal, glass, resin, or the like.

The band 20 is a band-shaped member that is connected to both ends of the body 10 in a predetermined direction and wound around the user's arm in a circular pattern together with the body 10, It should be noted that the band 20 needs only be worn on the user's arm by being wound around the user's arm in a circular pattern and does not need to have such a shape as to surround the entire perimeter of the area together with the body 10. That is, the band 20 may be a band-shaped member having such a shape as to surround 4/5 of the arm together with the body 10. The band 20 is made, for example, of resin such as silicone, metal, leather (including synthetic leather), or the like.

Let it be assumed here that the X axis is an axis of rotation that, when the wearable terminal 100 is worn on an arm (forearm), extends in a direction in which the arm (forearm) extends, Further, let it be also assumed that the Y axis is an axis of rotation that extends in the predetermined direction in the body 10 in a state where the display surface 11 of the body 10 is horizontal and facing a ceiling side (i.e. a side opposite to the direction of gravitational force). The following assumes that a direction parallel to the X axis is an X-axis direction and a direction parallel to the Y axis is a Y-axis direction. Further, let it be also assumed that a direction that is vertical (i.e. a direction perpendicular to the display surface 11) in a state where the display surface 11 of the body 10 is horizontal and facing the ceiling side (i.e. the side opposite to the direction of gravitational force) is a Z-axis direction.

Figure 2:
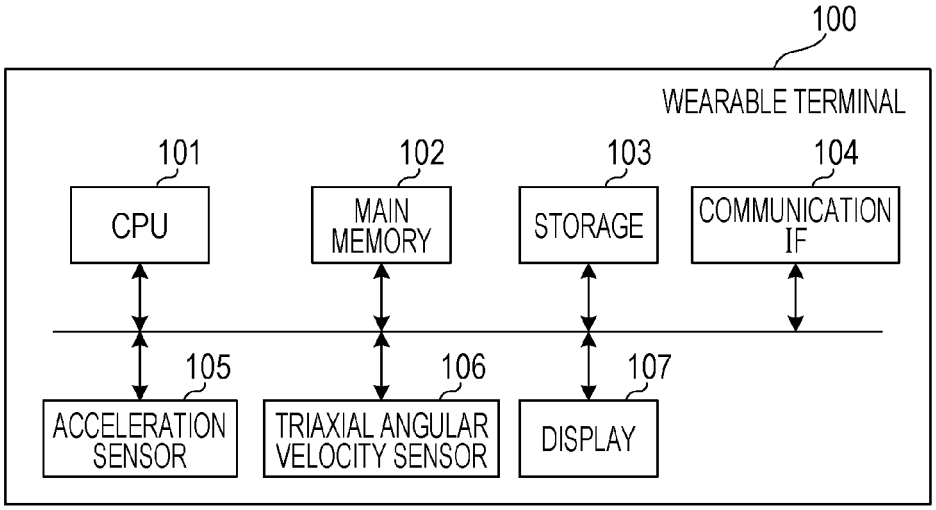
FIG. 2 is a block diagram showing a hardware configuration of the wearable terminal according to Embodiment 1.

FIG. 2 is a block diagram showing a hardware configuration of the wearable terminal according to Embodiment 1.

As shown in FIG. 2, the wearable terminal 100 includes a hardware configuration of a CPU 101 (central processing unit), a main memory 102, a storage 103, a communication IF 104 (interface), an acceleration sensor 105, a triaxial angular velocity sensor 106, and a display 107.

The CPU 101 is a processor that executes a control program stored in the storage 103 or the like.

The main memory 102 is a volatile storage area that is used as a work area when the CPU 101 executes the control program.

The storage 103 is a nonvolatile storage area in which the control program, content, and the like are stored.

The communication IF 104 is a network interface that exchanges data with another device over a network. The communication IF 104 is for example a wireless LAN (local area network) interface compatible with the IEEE 802.11a/b/g standard.

The acceleration sensor 105 is a sensor that detects the acceleration of the wearable terminal 100.

The triaxial angular velocity sensor 106 is a sensor that detects angular velocities of the wearable terminal 100 rotating on three axes extending, in three different directions, respectively.

The display 107 is a display device that displays pictures including, images. For example, the display 107 is a liquid crystal display, an organic EL display, or the like.

Figure 3:
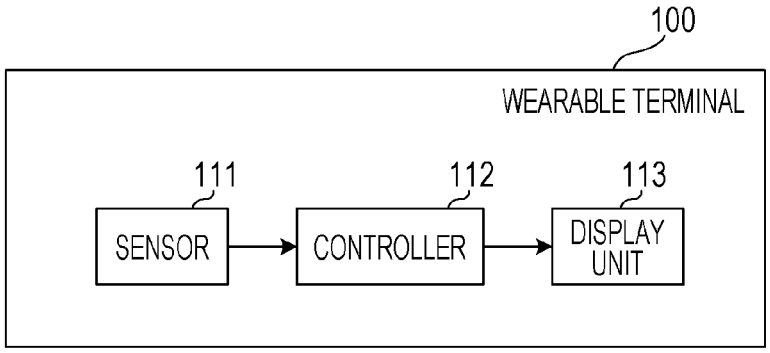
FIG. 3 is a block diagram showing a functional configuration of the wearable terminal according to Embodiment 1.

FIG. 3 is a block diagram showing a functional configuration of the wearable terminal according to Embodiment 1.

As shown in FIG. 3, the wearable terminal 100 includes a functional configuration of a sensor 111, a controller 112, and a display unit 113.

The sensor 111 detects a first angle of rotation of the display unit 113 of the wearable terminal 100 in a first direction of rotation. Further, the sensor 111 may also detect a second angle of rotation of the display unit 113 in a second direction of rotation that is different in axis of rotation from the first direction of rotation. Further, the sensor 111 may also detect a third angle of rotation of the display unit 113 in a third direction of rotation that is different in axis of rotation from the first direction of rotation and the second direction of rotation. That is, the sensor 111 is implemented using the triaxial angular velocity sensor 106. It should be noted that the sensor 111 may be implemented using the acceleration sensor 105 or a combination of the acceleration sensor 105 and the triaxial angular velocity sensor 106.

Figure 4:
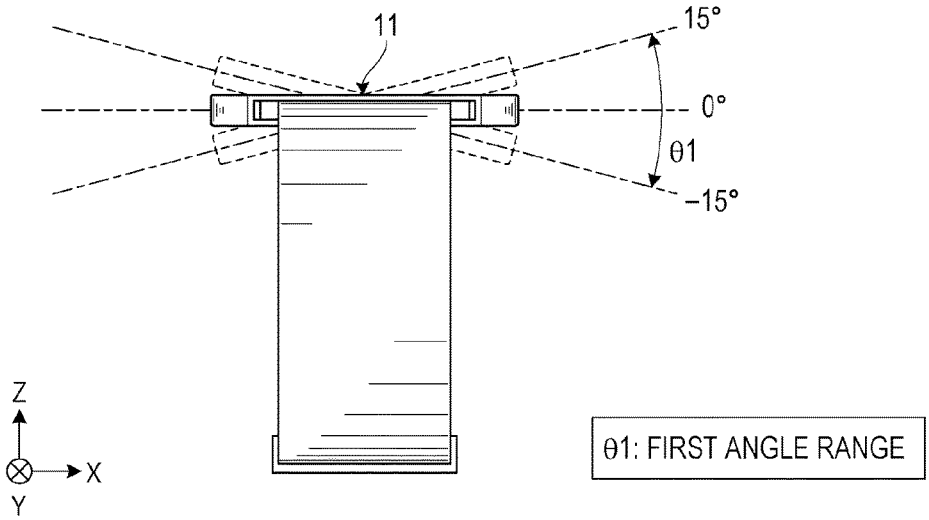
FIG. 4 is a diagram for explaining a case where a first angle of rotation according to Embodiment 1 falls within a first angle range.
Figure 5:
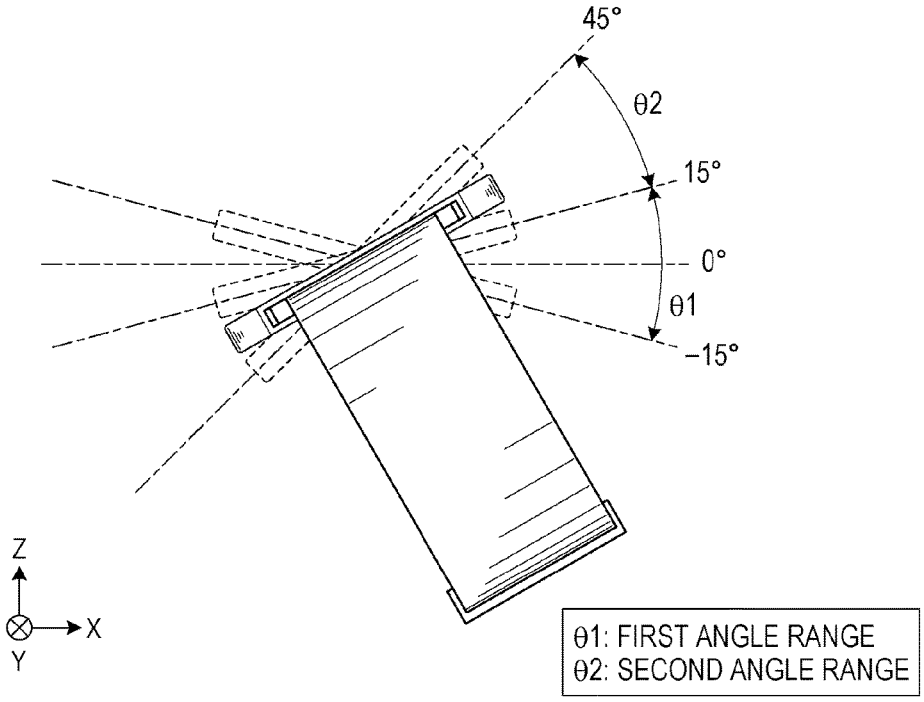
FIG. 5 is a diagram for explaining a case where the first angle of rotation according to Embodiment 1 falls within a second angle range.
Figure 6:
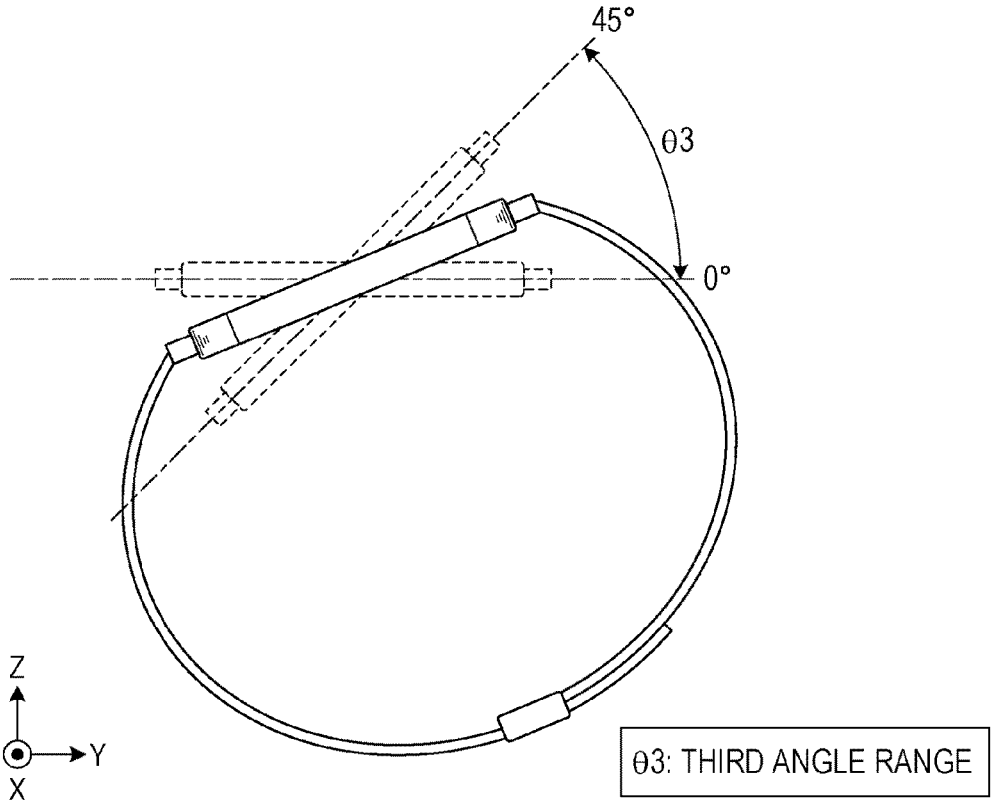
FIG. 6 is a diagram for explaining a case where a second angle of rotation according to Embodiment 1 falls within a third angle range.

The first, second, and third angles of rotation, which are detected by the sensor 111, are described in detail here with reference to FIGS. 4 to 6.

First, the first, second, and third directions of rotation refer to a direction of rotation about the Y axis, a direction of rotation about the X axis, and a directions of rotation about the axis parallel to the Z-axis direction. In Embodiment 1, the first, second, and third directions of rotation are directions that are orthogonal to one another.

FIG. 4 is a diagram for explaining a case where the first angle of rotations according to Embodiment 1 falls within a first angle range. FIG. 5 is a diagram for explaining a case where the first angle of rotation according to Embodiment 1 falls within a second angle range. FIG. 6 is a diagram for explaining a case where the second angle of rotation according to Embodiment 1 falls within a third angle range.

First, as shown in FIGS. 4 to 6, both the first and second angles of rotation are angles of rotation from a reference posture in which the display surface 11 of the display 107 constituting the display unit 113 is horizontal to the ground and facing the ceiling side (i.e. the side opposite to the ground). That is, the first and second angles of rotation indicate extents of rotation from 0 degree at which the display surface 11 intersects the direction of gravitational force at a substantially right angle and the display surface 11 laces a side opposite to a side of application of gravitational force.

As shown in FIG. 4, the first angle range θ1 is an angle range, for example, of not less than −15 degrees to less than 15 degrees in a case where the reference posture is 0 degree in the first direction of rotation about the Y axis.

As shown in FIG. 5, the second angle range θ2 is an angle range, for example, of not less than 15 degrees to less than 45 degrees in a case where the reference posture is 0 degree in the first direction of rotation about the Y axis and a positive direction of rotation is a direction in which the user turns his/her arm so that the display surface 11 faces away from the user's body. It should be noted that although FIG. 5 shows an example where the user wears the wearable terminal 100 on his/her left wrist, the angle range is reversed in the X-axis direction in a case where the user wears the wearable terminal 100 on his/her right wrist. That is, while a left rotation is positive direction of rotation in FIG. 5, a right rotation is the positive direction of rotation in a case where the wearable terminal 100 is worn on the right wrist. It should be noted that the user may be allowed to wear the wearable terminal 100 on his/her left or right wrist first and then set whether the wearable terminal 100 is worn on the left or right wrist and, in this case, the controller 112 may determine, according to the information thus set, whether the direction of rotation is positive or negative. Alternatively, a left rotation is set in advance to be the positive direction of rotation on the premise that the wearable terminal 100 is worn on the left wrist. It should be noted that, in FIGS. 4 and 5, the upper side of a display image displayed on the screen faces away from the front toward the paper plane. That is, m a case where the wearable terminal 100 is worn on the left wrist, the hand comes onto the right side of the wearable terminal 100 as seen from the front and the arm comes onto the left side of the wearable terminal 100 as seen from the front. Therefore, in a case where the wearable terminal 100 is worn on the left wrist, a change out of the first angle range θ1 into the second angle range θ2 can be made by shifting the arm from a substantially horizontal position to a position in which the wrist side is higher.

It should be noted that although, in FIG. 5, the first angle range θ1 and the second angle range θ2 are angle ranges that are adjacent to each other, this does not imply any limitation and there may be a gap of a predetermined angle (e.g. 2 degrees) between the first angle range θ1 and the second angle range θ2.

As shown in FIG. 6, the third angle range θ3 is an angle range, for example, of not less than 0 degrees to less than 45 degrees in a case where the reference posture is 0 degree in the second direction of rotation about the X axis and the positive direction of rotation is a direction in which the user twists his/her arm so that the display surface 11 faces toward the user's body. That is, in a case where the user adopts a posture of looking at the display surface 11 of the wearable terminal 100 by placing his/her forearm so that it is located.

along a horizontal direction in front of his/her body, the positive direction of rotation is a direction of rotation (direction of left rotation in FIG. 6) in which the user twists his/her arm so that the display surface 11 inclines toward the user's body (negative side of the Y-axis direction in FIG. 6), It should be noted that, in the second direction of rotation, the direction of left rotation in FIG. 6 is the positive direction of rotation regardless of whether the wearable terminal 100 is worn on the left or right wrist.

Since the first angle range θ1. the second angle range θ2, and the third angle range θ3 are defined as described above, a user wearing the wearable terminal 100 on his/her wrist can change the first angle of rotation, which is detected by the sensor 111 of the wearable terminal 100. for example, by simply turning his/her forearm in such a direction that the wrist comes closer to his/her face. This allows the user to easily switch from a state where a first display image 201 is displayed to simultaneous display.

The controller 112 controls display on the display unit 113. The controller 112 determines whether the second angle of rotation detected by the sensor 111 falls within the third angle range θ3 and whether the first angle of rotation detected by the sensor 111 falls within the first angle range θ1, and in a case where the controller 112 has determined, as a result of the determination, that the second angle of rotation fails within the third angle range θ3 and the first angle of rotation falls within the first angle range θ1, the controller 112 causes the display unit 113 to display the first display image 201. Further, the controller 112 determines whether the second angle of rotation detected by the sensor 111 falls within the third angle range θ3 and whether the first angle of rotation detected by the sensor 111 has changed out of the first angle range θ1 into the second angle range θ2, and in a case where the controller 112 has determined, as a result of the determination, that the second angle of rotation falls within the third at range θ3 and the first angle of rotation has changed out of the first angle range θ1 into the second angle range θ2, the controller 112 performs simultaneous display in which part of the first display image 201 and part of a second display image 202 that is different from the first display image 201 are simultaneously displayed in a display area 12 of the display unit 113.

Further, in a case where the second angle of rotation has changed into an angle range that does not overlap the third angle range θ3, the controller 112 may turn off display on the display unit 113.

Further, after having performed the simultaneous display, the controller 112 may determine whether the first angle of rotation detected by the sensor 111 has changed out of the second angle range θ2 back into the first angle range θ1, and in a case where the controller 112 has determined, as a result of the determination, that the first angle of rotation has changed out of the second angle range θ2 back into the first angle range θ1, the controller 112 may perform display control to cause the display unit 113 to display the second display image 202 and does not cause the display unit to display the first display image 201.

The display unit 113 performs display in the display area 12.

1-2. Operation

Operation of the wearable terminal 100 thus configured is described with reference to FIGS. 7 to 10.

First, sleep control of the wearable terminal 100 is described with reference to FIGS. 7 and 8.

Figure 7:
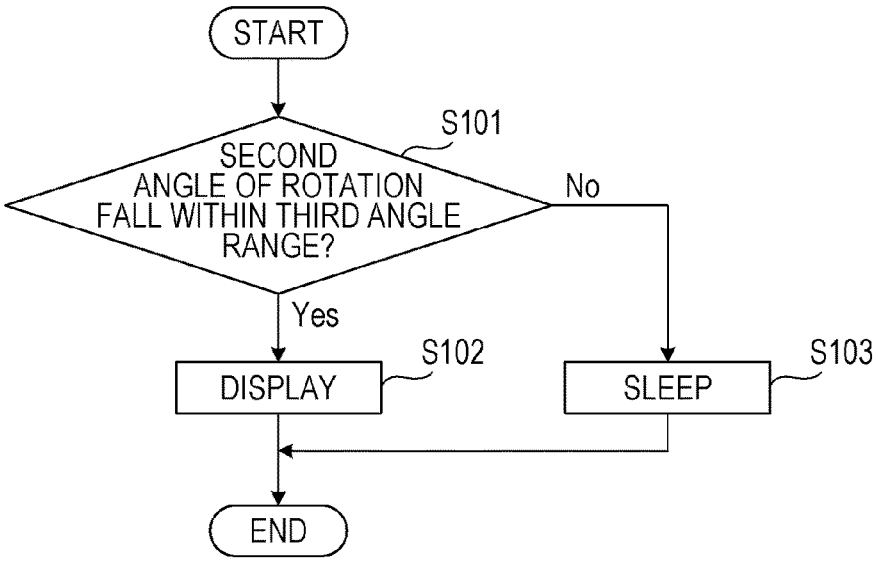
FIG. 7 is a flow chart or explaining an example of sleep control of the wearable terminal according to Embodiment 1.
Figure 8:
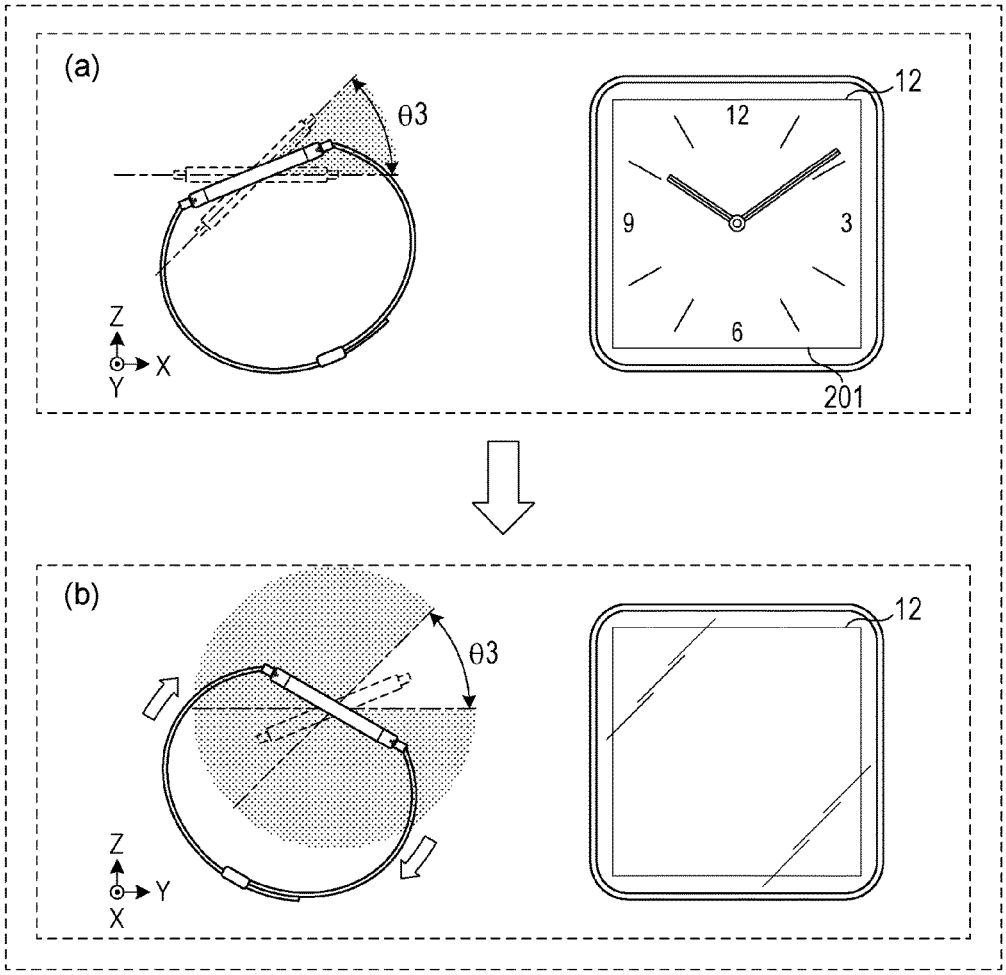
FIG. 8 is a diagram showing a relationship between a display image that is displayed during sleep control performed by a controller according to Embodiment 1 and the posture of the wearable terminal.

FIG. 7 is a flow chart for explaining an example of sleep control of the wearable terminal according to Embodiment 1. FIG. 8 is a diagram showing a relationship between a display image that is displayed during sleep control performed by the controller according to Embodiment 1 and the posture of the wearable terminal.

First, the controller 112 determines whether the second angle of rotation detected by the sensor 111 falls within the third angle range θ3 (S101).

In a case where the controller 112 has determined that the second angle of rotation detected by the sensor 111 falls within the third angle range θ3 (Yes in S101), the controller 112 causes the display unit 113 to display an appropriate display image according to that occasion such as the first display image 201, the second display image 202. or the simultaneous display (S102). Specifically, in a case where the controller 112 has determined that the second angle of rotation falls within the third angle range θ3, the controller 112 causes the display unit 113, for example, to display the first display image 201 in the display area 12 of the display unit 113 as shown in (a) of FIG. 8.

Note here that the first display image 201 is a display image that represents a first application that is executable in the wearable terminal 100, In Embodiment 1, the first application is for example an application for graphically displaying a clock (at least either an analog clock or a digital clock) that shows the current time.

In a case where the controller 112 has determined that the second angle of rotation detected by the sensor 111 does not falls within the third angle range θ3 (i.e. falls within an angle range that does not overlap the third angle range θ3) (No in S101), the controller 112 turns off display on the display unit 113 and causes the display unit 113 to sleep (S103). By so doing, the controller 112 causes the display unit 113 to display nothing In this way, the controller 112 switches, according to whether the second angle of rotation falls within the third angle range θ3, between causing the display unit 113 to display a display image and causing, the display unit 113 to display no display image. In this sleep control, whether the user is looking at the display surface 11 of the wearable terminal 100 is determined according to whether the second angle of rotation fails within the third angle range θ3. In a case where the second angle of rotation falls within the third angle range θ3, it is determined that user is looking at the display surface 11. In a case where the second angle of rotation does not fail within the third angle range θ3, it is determined that user is not looking at the display surface 11. By thus causing the display unit 113 to sleep in a case where the user is not looking at the display surface 11, a reduction in power consumption is achieved.

It should be noted that this sleep control is always performed in a state where the wearable terminal 100 is on. That is, the sleep control is performed in parallel with display control that is described next.

Next, display control of the wearable terminal 100 is described with reference to FIGS. 9 and 10.

Figure 9:
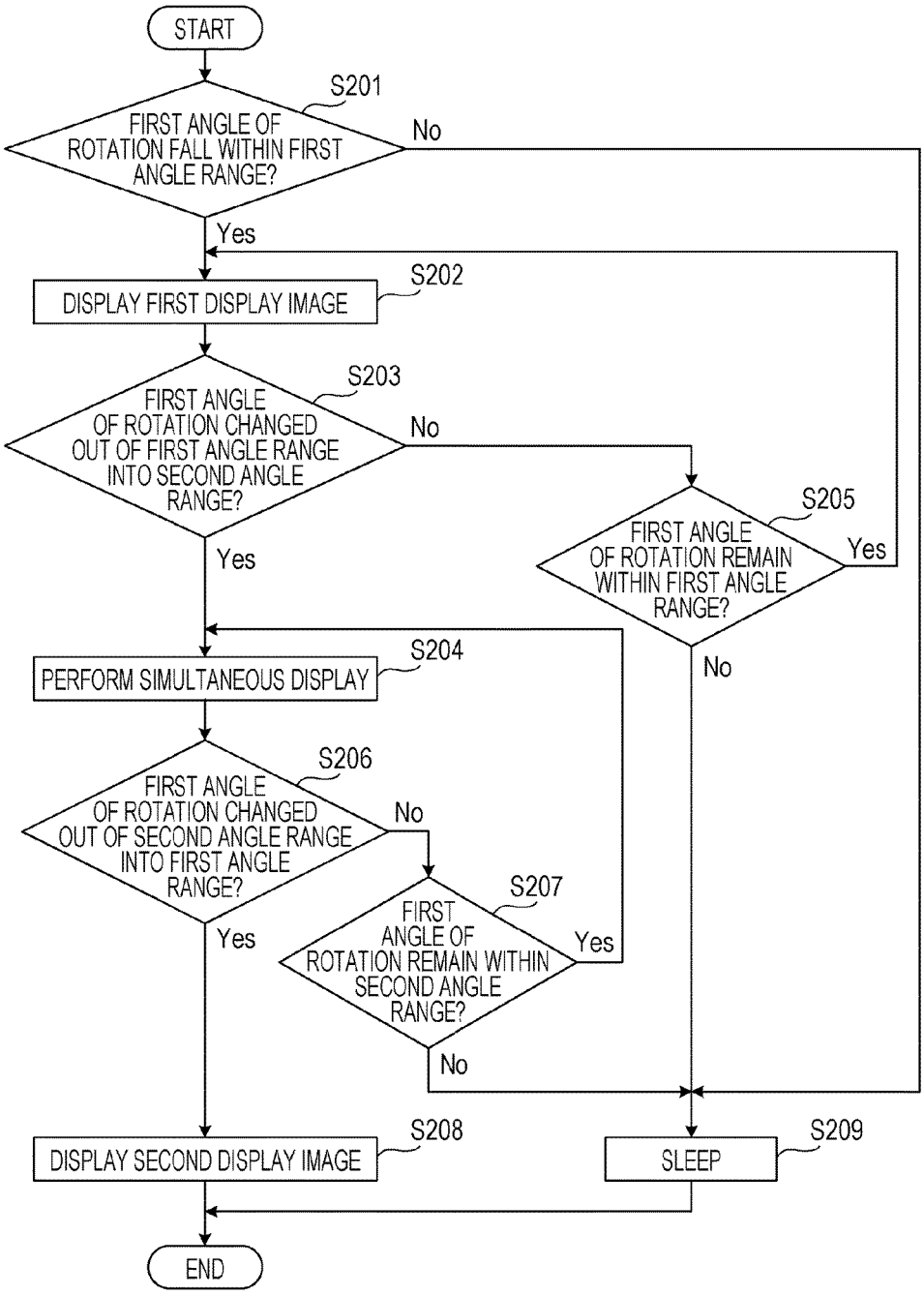
FIG. 9 is a flow chart for explaining an example of display control of the wearable terminal according to Embodiment 1.

FIG. 9 is a flow chart for explaining an example of display control of the wearable terminal according to Embodiment 1. FIG. 10 is a diagram showing a relationship between a display image that is displayed during display control performed by the controller according to Embodiment 1 and the posture of the wearable terminal. It should be noted that this display control, which is performed in parallel with the sleep control, is performed when it has been determined in the sleep control that the display unit 113 is allowed to display a display image.

First, the controller 112 determines whether the first angle of rotation detected by the sensor 111 falls within the first angle range θ1 (S201).

Figure 10:
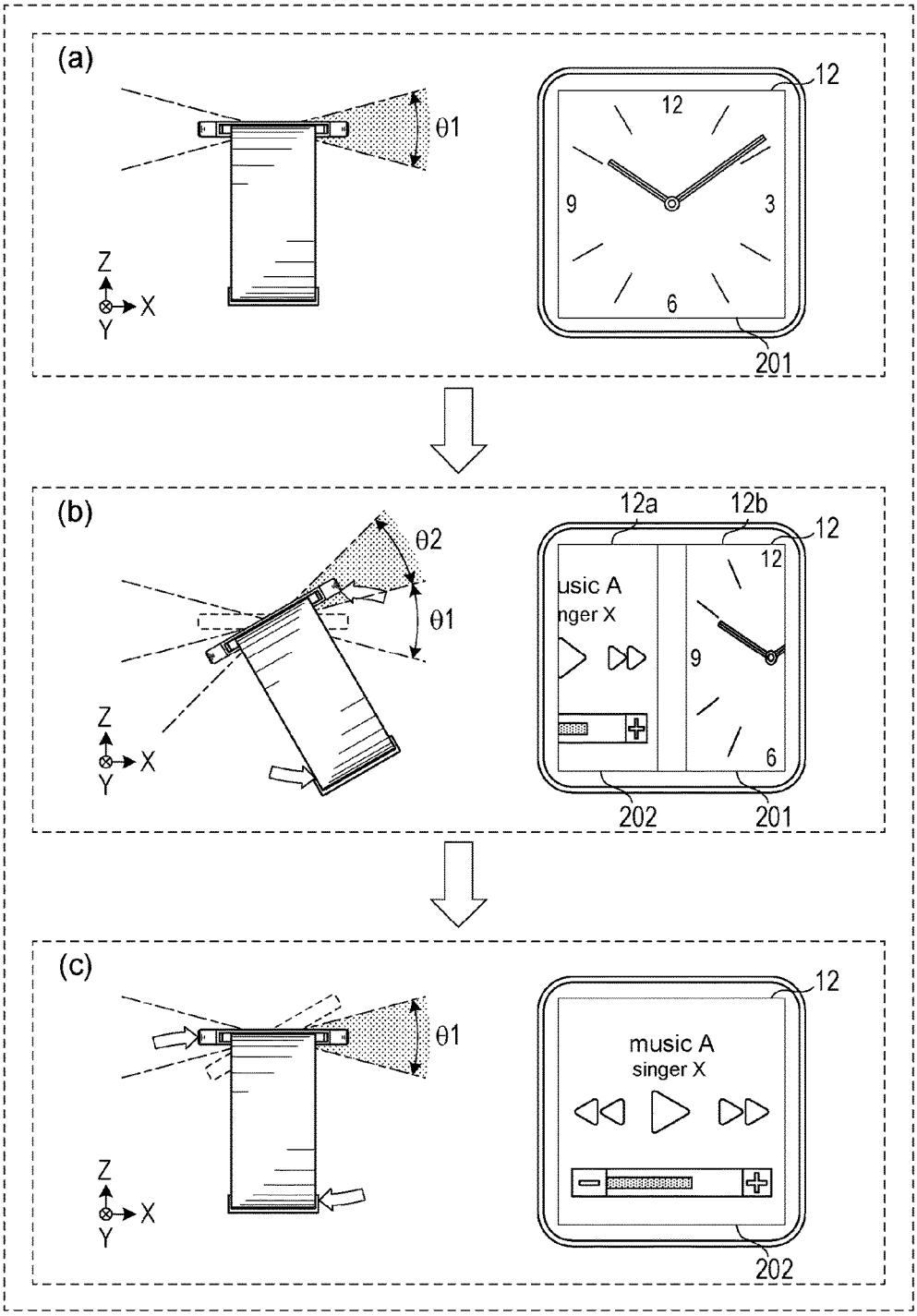
FIG. 10 is a diagram showing a relationship between a display image that is displayed during display control performed by the controller according to Embodiment 1 and the posture of the wearable terminal.

In a case where the controller 112 has determined that the first angle of rotation detected by the sensor 111 falls within the first angle range θ1 (Yes in S201), the controller 112 causes the display unit 113 to display the first display image 201 in the display area 12 (S202), Specifically, the controller 112, which is also performing the sleep control at the same time, causes the display unit 113, for example, to display only the first display image 201 in the display area 12 in a case where, as shown in (a) of FIG. 10, the second angle of rotation falls within the third angle range θ3 and the first angle of rotation falls within the first angle range θ1. It should be noted that instead of causing only the first display image 201 to be displayed, the controller 112 may cause the display unit 113 to display, together with the first display image 201, a display image (such as a display image of notification of apps) that is different from the first display image 201.

On the other hand, in a case where the controller 112 has determined that the first angle of rotation detected by the sensor 111 does not falls within the first angle range θ1 (No in S201), the controller 112 causes the display unit 113 to sleep (S209).

Next, the controller 112 determines whether the first angle of rotation detected by the sensor 111 has changed out of the first angle range θ1 into the second angle range θ2 (S203).

In a case where the controller 112 has determined that the first angle of rotation detected by the sensor 111 has changed out of the first angle range θ1 into the second angle range θ2 (Yes in S203), the controller 112 performs simultaneous display in which the display unit 113 simultaneously displays part of the first display image 201 and part of the second display image 202 in the display area 12 (S204). Specifically, the controller 112, which is also performing the sleep control at the same time, causes a left part of the first display image 201 and a tight part of the second display image 202 to be simultaneously displayed in the same display area 12 in a case where, as shown in (a) and (b) of FIG. 10, the second angle of rotation falls within the third angle range θ3 and the first angle of rotation has changed out of the first angle range θ1 into the second angle range θ2 (the first angle of rotation has changed from being as shown in (a) of FIG. 10 to being as shown in (b) of FIG. 10). It should be noted here that the second display image 202 is a display image that represents a second application that is different from the first application and executable in the wearable terminal 100. In Embodiment 1, the second application is for example an application that serves as a music player that plays back a music file. That is, the second display image 202 serves as a GUI (graphic user interface) of the music player.

It should be noted that the first display image 201 and the second display image 202 are not limited to display images that represent different applications, but may be a first image and a second image that are displayed in an image-viewing app. Alternatively, the first display image 201 and the second display image 202 may be images that represent first and second pieces of music (albums), respectively, that are played back in a music player app. in this case, control of a skip from one music track to another may also be performed by switching from the first display image 201 to the second display image 202. In addition, the first display image 201 and the second display image 202 may be any images such as different images of different applications or different images in the same application.

Further, in the simultaneous display, the controller 112 causes the display unit 113 to display part (e.g. the right part) of the second display image 202 in a first display area 12a and display part (e.g. the left part) of the first display image 201 in a second display area 12b. It should be noted that, in the posture that the wearable terminal 100 adopts when the first angle of rotation fails within the second angle range θ2, the first display area 12a is a lower part of the display area 12 (i.e. part of the display area 12 on a negative side of the Z-axis direction) and the second display area 12b is an upper part of the display area 12 (i.e. part of the display area 12 on a positive side of the Z-axis direction). Since, in this case, the simultaneous display is performed in a posture inclined in the direction of rotation about the Y axis, the first display area 12a is the left one of the two display areas divided from each other in a direction (horizontal direction on the paper plane of (b) of FIG. 10) orthogonal to the predetermined direction of the body 10 and the second display area 12b is the right one of the two display areas divided from each other in the direction (horizontal direction on the paper plane of (b) of FIG. 10) orthogonal to the predetermined direction. For this reason, when the user performs an operation of switching from the simultaneous display to the second to display image 202 by changing out of the second angle range θ2 into the first angle range θ1, the user can be given the sensation of pulling up the second display image 202, which is to be displayed next, from below and display it on the display unit 113.

It should be noted that, in the simultaneous display, the controller 112 may put the display images in each other's positions. That is, in the simultaneous display, the controller 112 may cause the display unit 113 to display part (e.g. a right part) of the first display image 201 in the first display area 12a and display part (e.g. a left part) of the second display image 202 in the second display area 12b. It should be noted that, in the posture that the wearable terminal 100 adopts when the first angle of rotation falls within the second angle range θ2, the first display area 12a is the lower part of the display area 12 and the second display area 12b is the upper part of the display area 12. For this reason, when the user performs an operation of switching from the simultaneous display to the second display image 202 by changing out of the second angle range θ2 into the first angle range θ1, the user can be given the sensation of dropping the second display image 202, which is to be displayed next, in the direction of gravitational force and thereby display it on the display unit 113.

Further, in shifting from a state where the first display image 201 is displayed to the simultaneous display, the controller 112 may cause the display unit 113 to perform such display that the first display image 201 and the second display image 202 are slid rightward so that only the left part of the first display image 201 is displayed by sliding the first display image 201 rightward and, at the same time, only the right part of the second display image 202 is displayed by sliding the second display image 202 rightward from an outer left side of the display area 12 toward the display area 12.

Further, in shifting from the simultaneous display to displaying the second display image 202, the controller 112 may cause the display unit 113 to perform such display that the simultaneous display is slid rightward as it is, the left part of the first display image 201 is slid to an outer side of the display area 12, and the second display image 202 is slid so as to gradually change from displaying only its right part to displaying its entirety.

Further, although, in the case of simultaneous display, the controller 112 causes the left part of the first display image 201 and the right part of the second display image 202 to be displayed, this does not imply any limitation and the controller 112 may cause an entirely scaled-down version of the first display image 201 and an entirely scaled-down version of the second display image 202 to be displayed. In this case, the entirely scaled-down versions of the first and second display images 201 and 202 may be ones with their aspect ratios kept the same, ones with their aspect ratios varied, or ones deformed into trapezoids, rhombuses, circles, and the like.

Continued reference is made to step S203. On the other hand, in a case where the controller 112 has determined that the first angle of rotation detected by the sensor 111 has not changed out of the first angle range θ1 into the second angle range θ2 (No in S203), the controller 112 determines whether the first angle of rotation remains within the first angle range θ1 (S205). If the first angle of rotation remains within the first angle range θ1 (Yes in S205), the controller 112 returns to step S202 and keeps the first display image 201 displayed. In a case where the controller 112 has determined, as a result of the determination of S205, that the first angle of rotation does not fail within the first angle range θ1 (i.e. does not fail within the first angle range θ1 or the second angle range θ2) (No in S205), the controller 112 causes the display unit 113 to sleep (S209).

After the simultaneous display in step S204, the controller 112 determines whether the first angle of rotation has changed out of the second angle range θ2 into the first angle range θ1 (S206).

In a case where the controller 112 has determined that the first angle of rotation detected by the sensor 111 has changed out of the second angle range θ2 into the first angle range θ1 (Yes in S206), the controller 112 causes the display unit 113 to display the second display image 202 in the display area 12 and does not cause the display unit 113 to display the first display image 201 in the display area 12 (S208). Specifically, in a case where, as shown in (b) and (c) of FIG. 10, the second angle of rotation falls within the third angle range θ3 and the first angle of rotation has changed out of the second angle range θ2 into the first angle range θ1 (the first angle of rotation has changed from being as shown in (b) of FIG. 10 to being as shown in (c) of FIG. 10), the controller 112 can switch from the simultaneous display to causing the display unit 113 to display only the second display image 202 in the display area 12. It should be noted that instead of causing only the second display image 202 to be displayed, the controller 112 may cause the display unit 113 to display, together with the second display image 202, a display image (such as a display image of notification of apps) that is different from the second display image 202.

On the other hand, in a case where the controller 112 has determined that the first angle of rotation detected by the sensor 111 has not changed out of the second angle range θ2 into the first angle range θ1 (No in S206), the controller 112 determines that the first angle of rotation remains within the second angle range θ2 (S207). If the first angle of rotation remains within the second angle range θ2 (Yes in S207), the controller 112 returns to step S204 and continues the simultaneous display. In a case where the controller 112 has determined, as a result of the determination of S207, that the first angle of rotation does not fall within the second angle range θ2 (i.e. does not fill within the first angle range θ1 or the second angle range θ21 (No in S207), the controller 112 causes the display unit 113 to sleep (S209).

1-3. Advantageous Effects and the Like

As described above, the wearable terminal 100 according to the present embodiment is configured such that a transition from a state where the first display image is displayed to a state where part of the first display image 201 and part of the second display image 202 are displayed is made in a case where the first angle of rotation detected by the sensor 111 of the wearable terminal 100 has changed out of the first angle range θ1 into the second angle range θ2. This allows the user to confirm the simultaneous display, which suggests switching to the second display image 202, which is a display image that comes after the first display image 201. This allows the user to know how he/she should rotate the wearable terminal 100 to switch to the next display image, thus allowing the user to easily switch to the next display image. This allows the user to switch display images without taking much time, thus allowing the wearable terminal 100 to consume less electricity.

Further, the wearable terminal 100 is configured such that in a case where, after the simultaneous display has been performed, the first angle of rotation detected by the sensor 111 has changed out of the second angle range θ2 back into the first angle range θ1, the controller 112 causes the display unit 113 to display the second display image 202 and does not cause the display unit 113 to display the first display image 201. This allows the user to, by simply changing the first angle of rotation of the wearable terminal 100 into the first angle range θ1 in a state where the simultaneous display is performed, switch the display unit 113 from displaying the first display image 201 to displaying the second display image 202 via the simultaneous display.

Further, the first display image 201 is a display image that represents the first application that is executable in the wearable terminal 100, and the second display image 202 is a display image that represents the second application that is different from the first application and executable in the wearable terminal 100. This allows the user to, by simply changing the first angle of rotation of the wearable terminal 100 out of the second angle range θ2 into the first angle range θ1 in a state where the simultaneous display is performed, cause the display unit 113 to simultaneously display, in the display area 12, a display image representing the first application and a display image representing the second application.

Further, the wearable terminal 100 is configured such that the sensor 111 detects the second angle of rotation in the second direction of rotation that is different in axis of rotation from the first direction of rotation, that in a case where, in a result of the detection performed by the sensor 111, the second angle of rotation fills within the third angle range θ3 and the first angle of rotation falls within the first angle range θ1, the controller 112 causes the display unit 113 to display the first display image 201, and that in a case where, in the result of the detection performed by the sensor 111, the second angle of rotation fills within the third angle range θ3 and the first angle of rotation has changed out of the first angle range θ1 into the second angle range θ2, the controller 112 performs simultaneous display. This allows the wearable terminal 100 to switch display images on the display unit 113 not only according to the first angle of rotation in the first direction of rotation but also according to the second angle of rotation in the second direction of rotation. This allows the controller 112 to utilize a change in the second angle of rotation to switch to a display image that is different from the simultaneous display.

Further, when the X axis is an axis of rotation that, when the wearable terminal 100 is worn on an arm, extends in a direction in which the arm extends and the Y axis is an axis of rotation that extends in the predetermined direction in the body 10, the first direction of rotation indicates a direction of rotation about the Y axis and the second direction of rotation indicates a direction of rotation about the X axis.

This allows a user wearing the wearable terminal 100 on his/her wrist to change the first angle of rotation, which is detected by the sensor 111 of the wearable terminal 100, for example, by simply turning his/her forearm in such a direction that the wrist comes closer to his/her face. This allows the user to easily switch from the first display image 201 to the simultaneous display.

Further, the wearable terminal 100 is configured such that in a case where the second angle of rotation has changed into an angle range that does not overlap the third angle range θ3, the controller 112 turns off display on the display unit 113. This allows the wearable terminal 100 not only to switch from the first display image 201 to the simultaneous display according to a change in the first angle of rotation in the first direction of rotation but also to switch from the first display image 201 or the simultaneous display to the turning off of display on the display unit 113 according to a change in the second angle of rotation. This makes it possible to turn off display on the display unit 113, for example, in a case where the controller 112 has determined, according to a result of detection performed by the sensor 111, that the user is in such a posture that the user is not viewing the display unit 113, thus making it possible to reduce power consumption. Further, by assigning the function of display control (display switch process) and the function of sleep control (process of switching to sleep state) according to results of detection of the first and second angles of rotation about two different axes of rotation, respectively, the display control process and the sleep control process can be performed without confusion. This makes it possible to effectively achieve two different functions by detecting a rotating operation.

Modification 1

Next, Modification 1 of Embodiment 1 is described.

Although Embodiment 1 is configured such that in a case where, after the simultaneous display has been performed, the first angle of rotation of the wearable terminal 100 has changed out of the second angle range θ2 into the first angle range θ1, the display unit 113 displays the second display image 202 in the display area 12, this does not imply any limitation. Specifically, the second angle range θ2 may be further divided into two angle ranges, and it may be determined whether there has been a change out of either of the two angle ranges, which are segmented by being divided, into the first angle range θ1, whereby according to a result of the determination, a change from the state of simultaneous display to displaying either the first display image 201 or the second display image 202 may be made.

Figure 11:
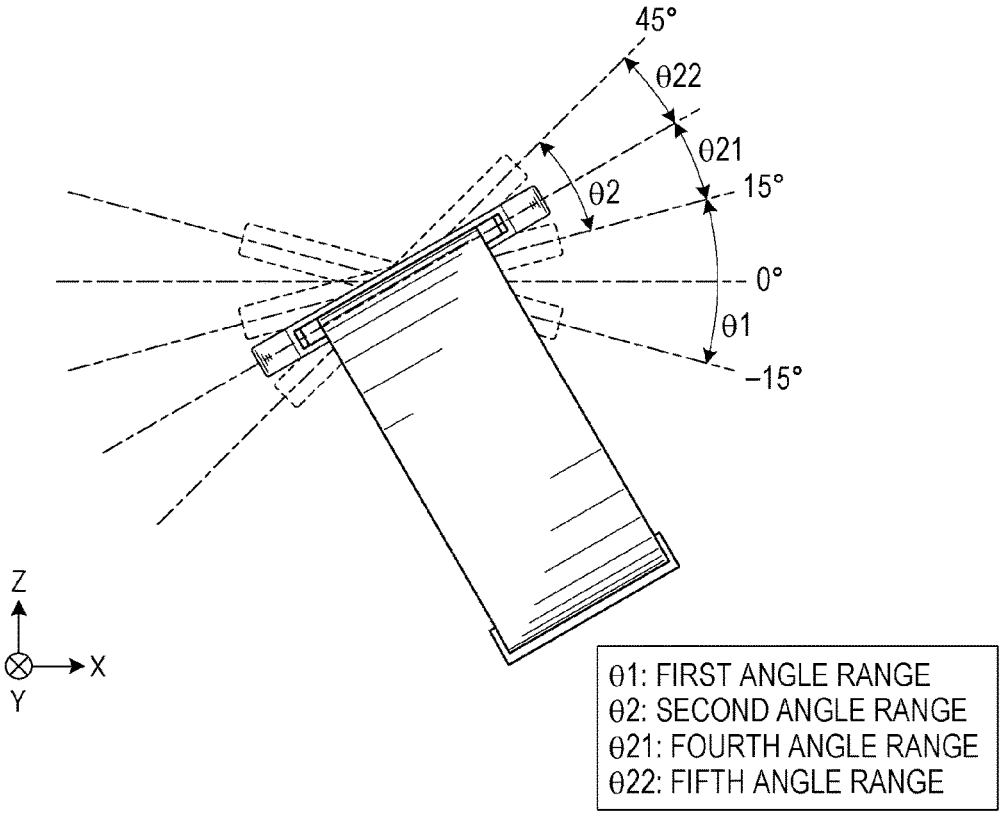
FIG. 11 is a diagram for explaining a case where a first angle of rotation according to Modification 1 of Embodiment 1 falls within a fourth angle range or a fifth angle range.

FIG. 11 is a diagram for explaining a case where a first angle of rotation according to Modification 1 of Embodiment 1 fails within a fourth angle range or a fifth angle range.

As shown in FIG. 11, the second angle range θ2 is segmented into a fourth angle range θ21 provided on the side of the first angle range θ1 (negative side of the direction of rotation) and a fifth angle range θ22 provided on a side opposite to the first angle range θ1 across the fourth angle range θ21 (positive side of the direction of rotation of the fourth angle range θ21). That is, the second angle range θ2 includes the fourth angle range θ21 and the fifth angle range θ22. It should be noted that although, in FIG. 11, the fourth angle range θ21 and the fifth angle range θ22 are angle ranges that are adjacent to each other, this does not imply any limitation and there may be a gap of a predetermined angle (e.g, 2 degrees) between the fourth angle range θ21 and the fifth angle range θ22.

Next, operation of the wearable terminal 100 according to Modification 1 of Embodiment 1 is described with reference to FIG. 12.

Figure 12:
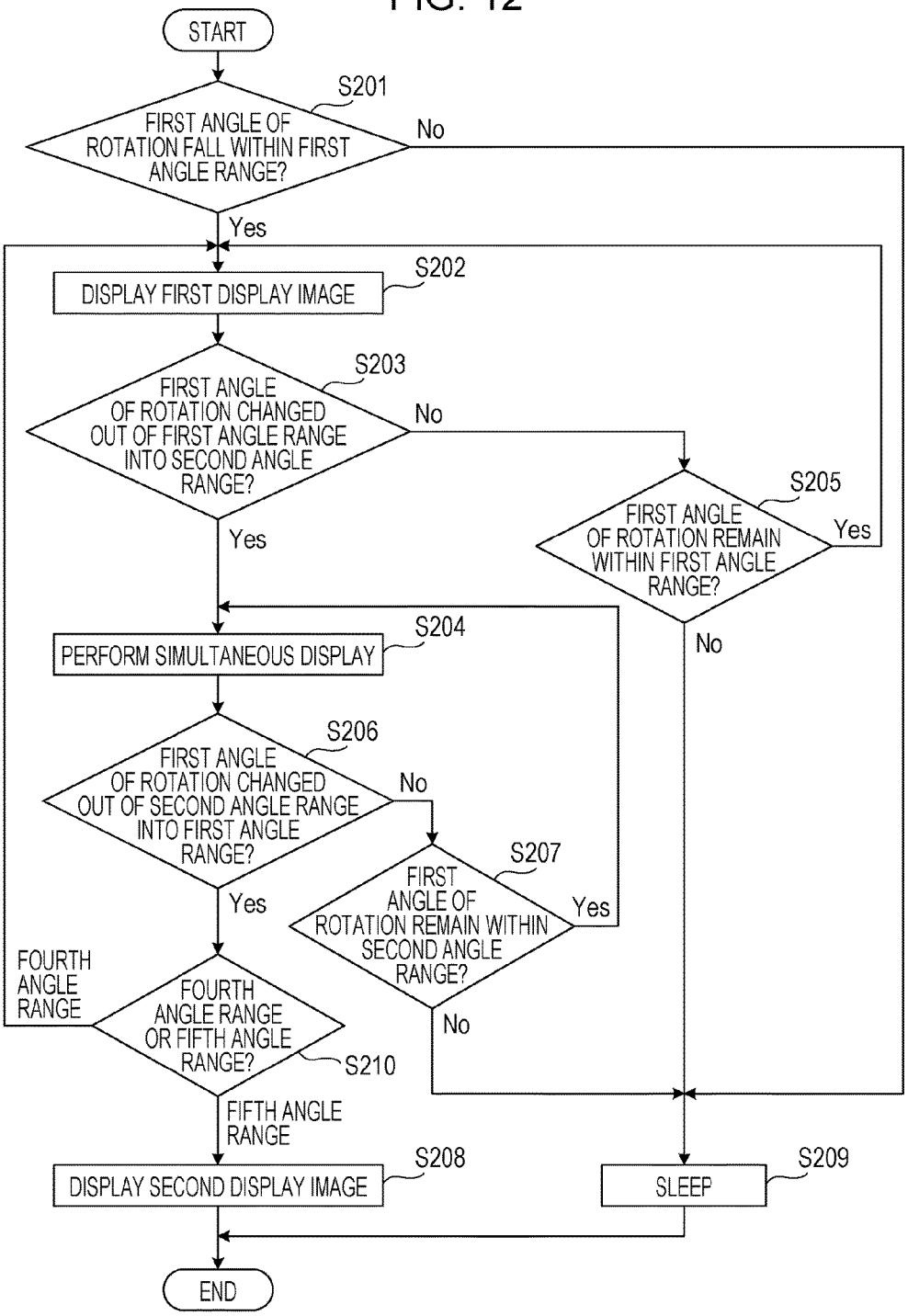
FIG. 12 is a flow chart for explaining an example of display control of the wearable terminal according to Modification 1 of Embodiment 1.
Figure 13:
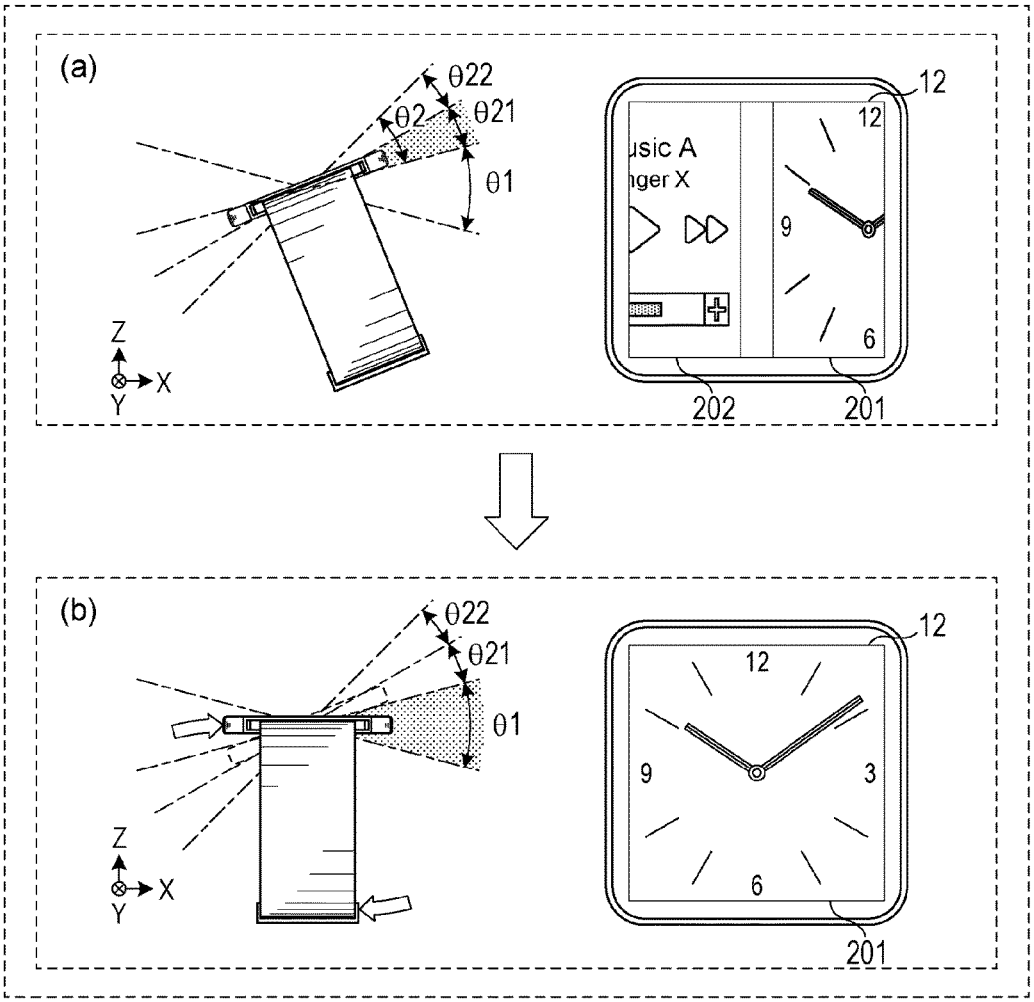
FIG. 13 is a diagram showing a relationship between a display image that is displayed during display control performed by a controller according to Modification 1 of Embodiment 1 in the case of a change out of the fourth angle range into the first angle range and the posture of the wearable terminal.
Figure 14:
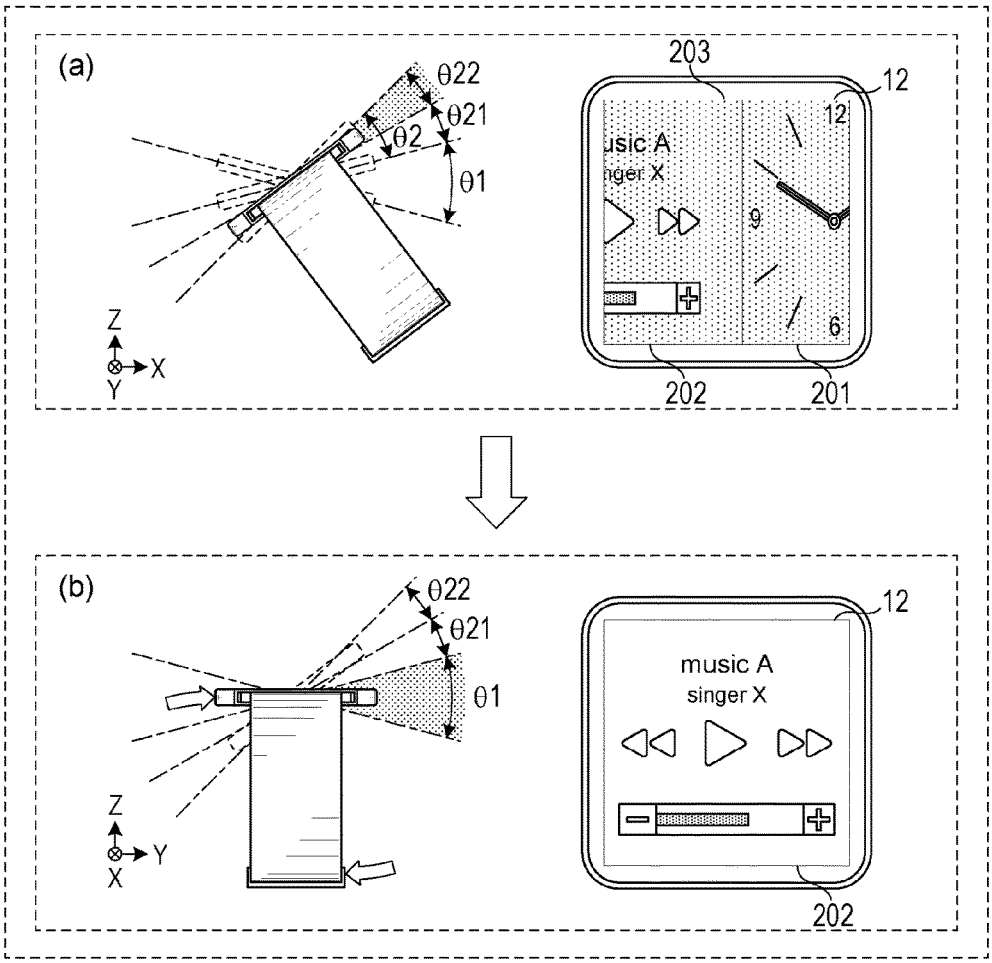
FIG. 14 is a diagram showing a relationship between a display image that is displayed during display control performed by the controller according to Modification 1 of Embodiment 1 in the case of a change out of the fifth angle range into the first angle range and the posture of the wearable terminal.

FIG. 12 is a flow chart for explaining an example of display control of the wearable terminal according to Modification 1 of Embodiment 1. FIG. 13 is a diagram showing a relationship between a display image that is displayed during display control performed by a controller according to Modification 1 of Embodiment 1 in the case of a change out of the fourth angle range into the first angle range and the posture of the wearable terminal. FIG. 14 is a diagram showing a relationship between a display image that is displayed during display control performed by the controller according to Modification 1 of Embodiment 1 in the case of a change out of the fifth angle range into the first angle range and the posture of the is terminal.

Since the display control according to Modification 1 of Embodiment 1 described with reference to FIG. 12 only differs from the display control according to Embodiment 1 described with reference to FIG. 9 in that a determination of step S210 is made after a "Yes" determination has been made in step S206, only step S210 is described here.

In a case where the controller 112 has made a "Yes" determination in step S206, the controller 112 determines whether the first angle of rotation has changed out of the fourth or fifth angle range θ21 or θ22 of the second angle range θ2 into the first angle range θ1 in step S206 (S210).

In a case where the controller 112 has determined that the first angle of rotation has changed out of the fourth angle range θ21 into the first angle range θ1 (FOURTH ANGLE RANGE in S210), the controller 112 returns to step S202 and causes the first display image 201 to be displayed. Specifically, in a case where the first angle of rotation has changed out of the fourth angle range θ21 into the first angle range θ1 as shown in (a) and (b) of FIG. 13 (the first angle of rotation has changed from being as shown in (a) of FIG. 13 to being as shown in (b) of FIG. 13), the controller 12 switches from the simultaneous display to causing the display unit 113 to display only the first display image 201 in the display area 12. It should be noted that instead of causing only the first display image 201 to be displayed, the controller 112 may cause the display unit 113 to display, together with the first display image 201, a display image (such as a display image of notification of apps) that is different from the first display image 201 to be displayed together with the first display image 201.

On the other hand, in a case where the controller 112 has determined that the first angle of rotation has changed out of the fifth angle range θ22 into the first angle range θ1 (FIFTH ANGLE RANGE in S210), the controller 112 shifts to step S208 and causes the second display image 202 to be displayed. Specifically, in a case where the first angle of rotation has changed out of the fifth angle range θ22 into the first angle range θ1 as shown in (a) and (b) of FIG. 14 (the first angle of rotation has changed from being as shown in (a) of FIG. 14 to being as shown in (b) of FIG. 14), the controller 12 switches from the simultaneous display to causing the display unit 113 to display only the second display image 202 in the display area 12. It should be noted that instead of causing only the second display image 202 to be displayed, the controller 112 may cause a display image (such as a display image of notification of apps) that is different from the second display image 202 to be displayed together with the second display image 202.

By thus executing step S210, the controller 112 causes the display unit 113 to display the second display image 202 in the display area 12 and does not cause the display unit 113 to display the first display image 201 in the display area 12 in a case where, in a result of detection performed by the sensor 111, the first angle of rotation has changed out of the fifth angle range θ22 back into the first angle range θ1, and the controller 112 causes the display unit 113 to display the first display image 201 in the display area 12 and does not cause the display unit 113 to display the second display image 202 in the display area 12 in a case where, in a result of detection performed by the sensor 111, the first angle of rotation has changed out of the fourth angle range θ21 back into the first angle range θ1.

This allows different display images to be displayed after the simultaneous display, depending on whether the first angle of rotation fell within the fifth angle range θ22, which is located farther from the first angle range θ1, of the second angle range θ2 before returning to the first angle range θ1 as a result of a rotation in a state where the simultaneous display is performed or the first angle of rotation fell within the fourth angle range θ21, which is located closer to the first angle range θ1, of the second angle range θ2 before returning to the first angle range θ1 as a result of a rotation in a state where the simultaneous display is performed. Further, in this case, when the first angle of rotation fell within the fifth angle range θ22, which is located farther from the first angle range θ1, switching from the simultaneous display to the second display image 202 takes place, and when the first angle of rotation fell within the fourth angle range θ21, which is located closer to the first angle range θ1, switching to the first display image 201 takes place instead of switching to the second display image 202. Thus, in a case where a rotation from a posture in which the first display image 201 is displayed to the posture of simultaneous display is large, switching to the second display image 202 takes place if the original posture is adopted as a result of a reverse rotation, and in a case where a rotation from a posture in which the first display image 201 is displayed to the posture of simultaneous display is small, returning to the first display image 201 takes place even if the original posture is adopted as a result of a reverse rotation. This allows the user to, by adjusting the degree of the angle by which a rotation is made, choose between switching to the second display image 202 and switching to the first display image 201 after having confirmed the simultaneous display.

Further, in the simultaneous display, as shown in (a) of FIG. 14, a third display image 203 indicating that the first angle of rotation has changed into the fifth angle range θ22 may be displayed together with the simultaneous display. The third display image 203 is for example a display image obtained by changing the overall color of the simultaneous display, a display image obtained by changing the outer circumferential color of the simultaneous display, and the like. That is, in a case where the first angle of rotation detected by the sensor 111 has changed out of the fourth angle range θ21 into the fifth angle range θ22, the controller 112 may perform the simultaneous display and display the third display image 203, which suggests switching from the first display image 201 to the second display image 202.

This allows the user to know that the display image to be displayed in the case of returning to the first angle range θ1 next as a result of a rotation is the second display image 202, which comes after the first display image 201, as the third display image 203 is displayed in a case where the first angle of rotation has changed into the fifth angle range θ22. This allows the user to, after having confirmed the simultaneous display, easily determine whether switching to the second display image 202 takes place or switching to the first display image 201 takes place, thus allowing the user to choose between switching to the second display image 202 and switching to the first display image 201,

Modification 2

Next, Modification 2 of Embodiment 1 is described.

In Embodiment 1 described above, the sleep control is performed by determining the second angle of rotation in addition to the first angle of rotation. However, it is not necessary to determine the second angle of rotation, nor is it necessary to perform the sleep control. In this case, specifically, the controller 112 determines whether the first angle of rotation detected by the sensor 111 falls within the first angle range θ1, and in a case where the controller 112 has determined, as a result of the determination, that the first angle of rotation falls within the first angle range θ1, the controller 112 causes the display unit 113 to display the first display image 201. Further, the controller 112 determines whether the first angle of rotation detected by the sensor 111 has changed out of the first angle range θ1 into the second angle range θ2, which does not overlap the first angle range θ1, and n a case where the controller 112 has determined, as a result of the determination, that the first angle of rotation has changed out of the first angle range θ1 into the second angle range θ2, the controller 112 performs simultaneous display in which part of the first display image 201 being displayed by the display unit 113 and part of the second display image 202 that is different from the first display image are simultaneously displayed in the display area 12 of the display unit 113.

Embodiment 2

Embodiment 2 is described below with reference to FIGS. 15 to 17.

A wearable terminal 100 according to Embodiment 2 is the same as the wearable terminal 100 according to Embodiment 1 in terms of configuration but different in terms of the content of display control performed by the controller 112.

Although, in Embodiment 1, the controller 112 determines an angle range assuming that the first direction of rotation is a direction of rotation about the Y axis, the controller 112 may alternatively determine an angle range assuming that the first direction of rotations is a direction of rotation about the X axis.

Figure 15:
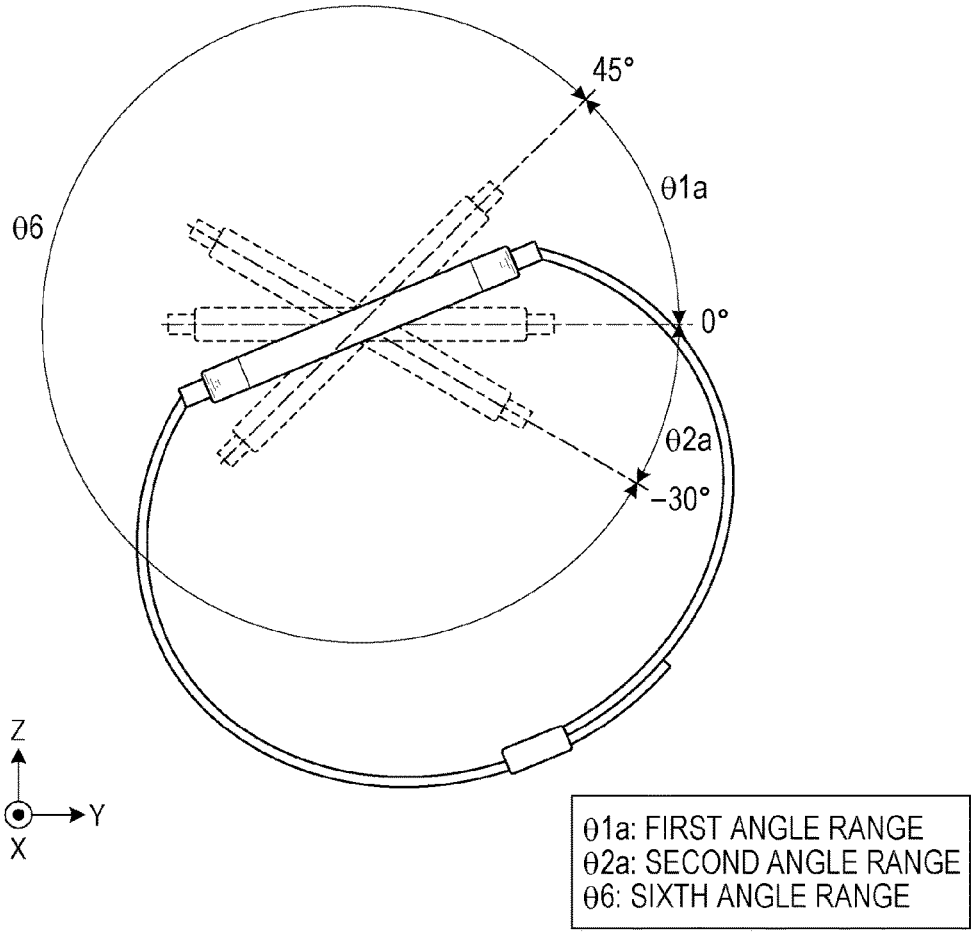
FIG. 15 is a diagram for explaining an angle range of a first angle of rotation according to Embodiment 2.
Figure 16:
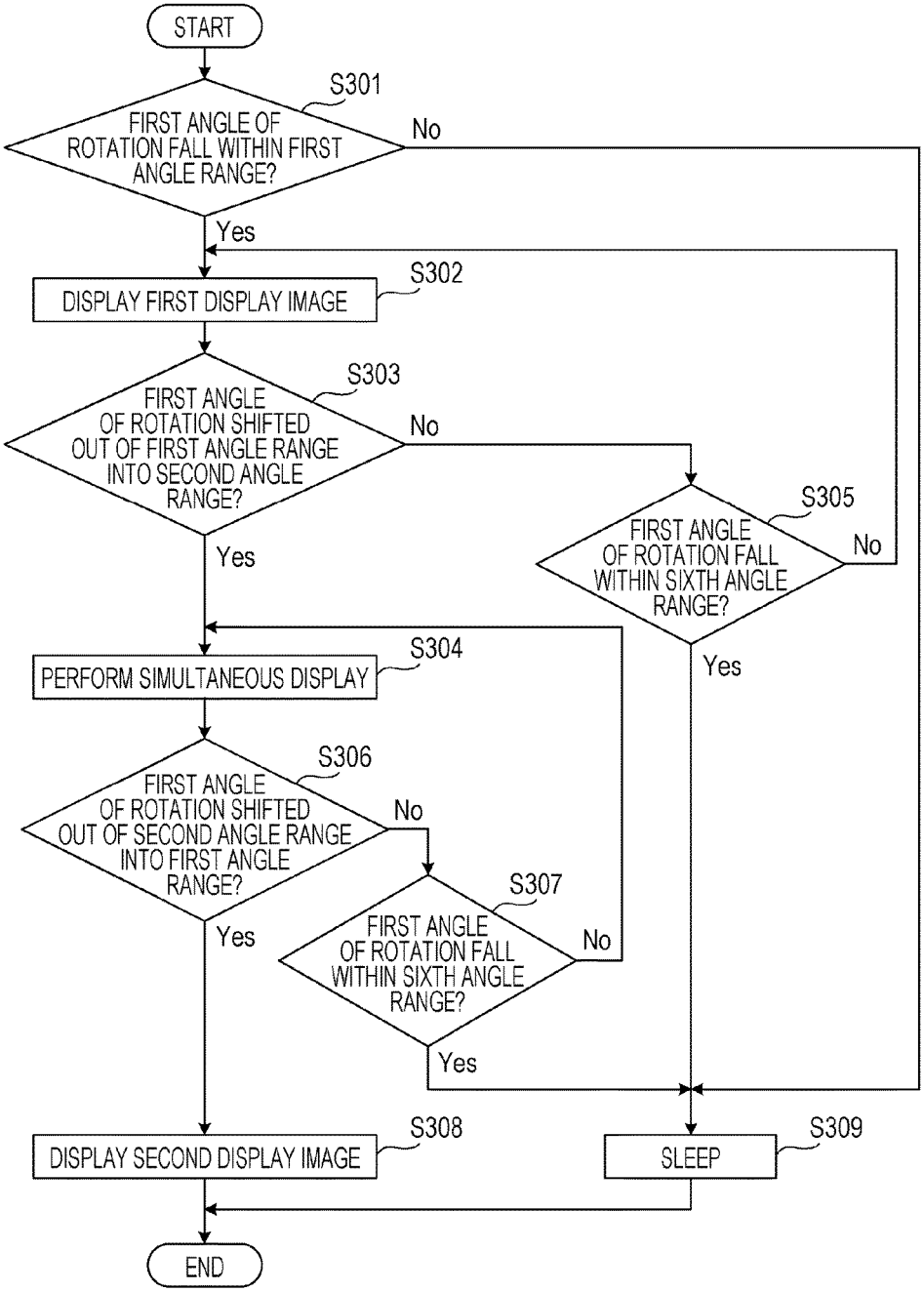
FIG. 16 is a flow chart for explaining an example of display control of a wearable terminal according to Embodiment 2.

FIG. 15 is a diagram for explaining an angle range of a first angle of rotation according to Embodiment 2. It should be noted that the reference posture is the same as that of Embodiment 1.

In this case, as shown in FIG. 15, the first angle range θ1a is an angle range, for example, of not less than 0 degree to less than 45 degrees in a case where the reference posture is 0 degree in the first direction of rotation about the X axis and a positive direction of rotation is a direction in which the user twists his/her arm so that the display surface 11 faces toward the user's body.

As shown in FIG. 15, the second angle range θ2a is an angle range, for example, of not less than −30 degrees to less than 0 degree in a case where the reference posture is 0 degree in the first direction of rotation about the X axis and the positive direction of rotation is a direction in which the user twists his/her arm so that the display surface 11 faces toward the user's body.

As shown in FIG. 15, the sixth angle range θ6 is an angle range, for example, of not less than 45 degrees to less than 180 degrees and not less than −180 degrees to less than −30 degrees in a case where the reference posture is 0 degree in the first direction of rotation about the X axis and the positive direction of rotation is a direction in which the user twists his/her arm so that the display surface 11 faces toward the user's body.

It should be noted that these angle ranges may be denoted as positive angle ranges instead oi'being denoted as negative angle ranges, That is, when denoted as positive angle ranges, the second angle range θ2a is an angle range of not less than 330 degrees to less than 360 degrees and the sixth angle range θ6 is an angle range of not less than 45 degrees to less than 330 degrees.

Thus, the second angle range θ2a is an angle range provided between the first angle range θ1a and the sixth angle range θ6. It should be noted that although, in FIG. 15, the first angle range θ1a and the second angle range θ2a are angle ranges that adjacent to each other, this does not imply any limitation and there may be a gap of a predetermined angle (e.g. 2 degrees) between the first angle range θ1a and the second angle range θ2a. The same applies to a relationship between the second angle range θ2a and the sixth angle range θ6 and a relationship between the sixth angle range θ6 and the first angle range θ1a.

Operation of the wearable terminal 100 thus configured is described with reference to FIGS. 16 to 18.

First, the controller 112 determines whether the first angle of rotation detected by the sensor 111 falls within the first angle range θ1a (S301).

Figure 17:
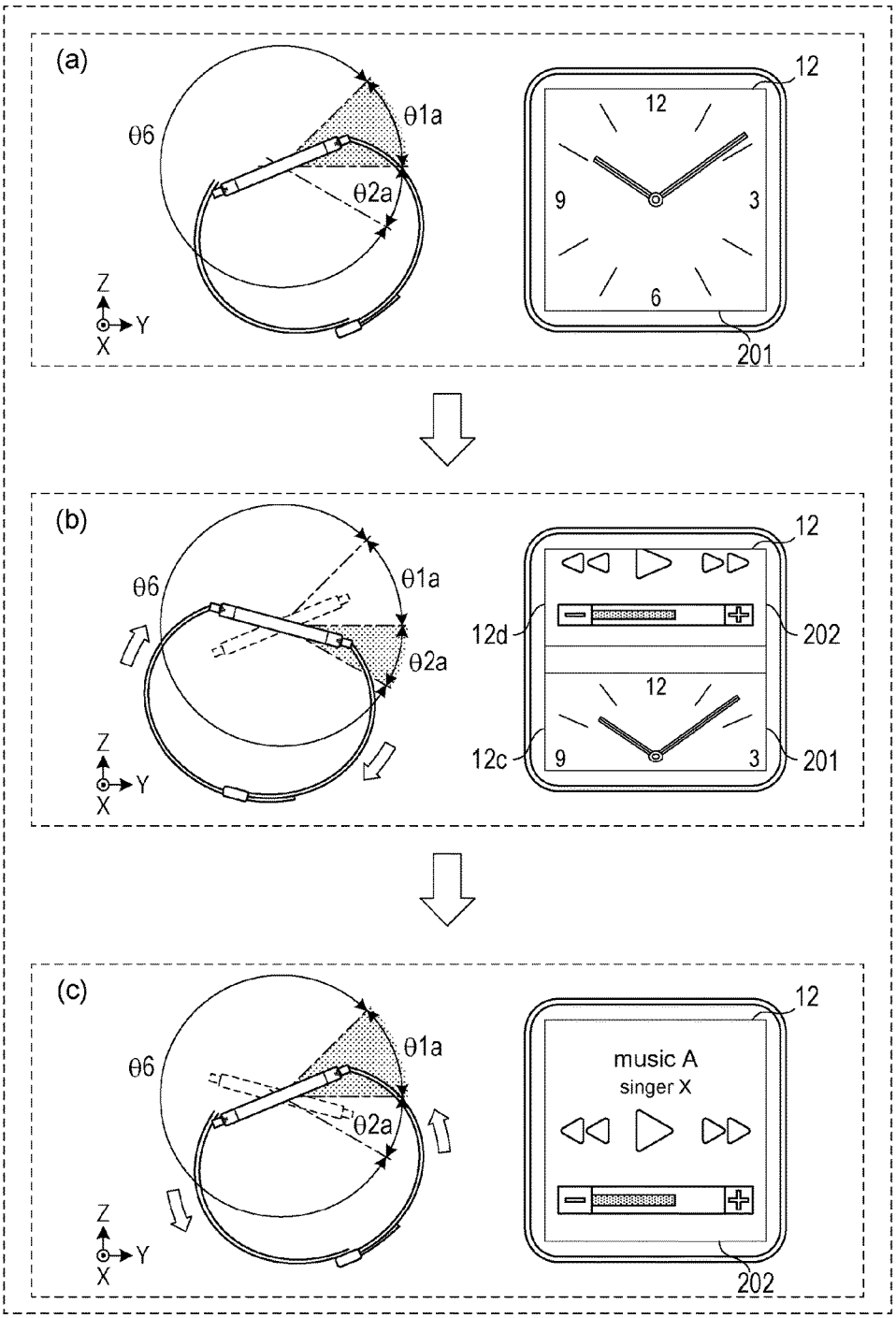
FIG. 17 is a diagram showing a relationship between a display image that is displayed during display control performed by a controller according to Embodiment 2 and the posture of the wearable terminal.

In a case where the controller 112 has determined that the first angle of rotation detected by the sensor 111 hills within the first angle range θ1a (Yes in S301), the controller 112 causes the display unit 113 to display the first display image 201 in the display area 12 as shown in (a) of FIG. 17 (S302).

On the other hand, in a case where the controller 112 has determined that the first angle of rotation detected by the sensor 111 does not within the first angle range θ1a (No in S301), the controller 112 causes the display unit 113 to sleep (S309).

Next, the controller 112 determines whether the first angle of rotation detected by the sensor 111 has changed out of the first angle range θ1a into the second angle range θ2a (S303).

In a case where the controller 112 has determined that the first angle of rotation detected by the sensor 111 has changed out of the first angle range θ1a into the second angle range θ2a as shown in (b) of FIG. 17 (Yes in S303), the controller 112 performs simultaneous display in which the display unit 113 simultaneously displays part of the first display image 201 and part of the second display image 202 in the display area 12 (S304). As in Embodiment 1, in the simultaneous display, the controller 112 causes the display unit 113 to display part of the second display image 202 in a first display area 12c and display part (e.g. the left part) of the first display image 201 in a second display area 12d. It should be noted that, in the posture that the it terminal 100 adopts in the simultaneous display, the first display area 12c is a lower part of the display area 12 (i.e. part of the display area 12 on a negative side of the Z-axis direction) and the second display area 12d is an upper part of the display area 12 (i.e. part of the display area 12 on a positive side of the Z-axis direction). However, unlike in Embodiment 1, since, in Embodiment 2, the simultaneous display is performed in a posture inclined in the direction of rotation about the X axis, the first display area 12c is the lower one of the two display areas divided from each other in the predetermined direction of the body 10 (vertical direction on the paper plane of (b) of FIG. 17) and the second display area 12b is the upper one of the two display areas divided from each other in the predetermined direction (vertical direction on the paper plane of (b) of FIG. 17). Further, an upper part of the first display image 201 is displayed in the first display area 12c as the part of the first display image 201, and a lower part of the second display image 202 is displayed in the second display area 12d as the part of the second display image 202.

Thus, even in a case where display control is performed according to the angle range of the direction of rotation about the X axis, when the user performs an operation of switching from the simultaneous display to the second display image 202 by changing out of the second angle range θ2 into the first angle range θ1, the user can be given the sensation of pulling up the second display image 202, which is to be displayed next, from below and display it on the display unit 113.

Figure 18:
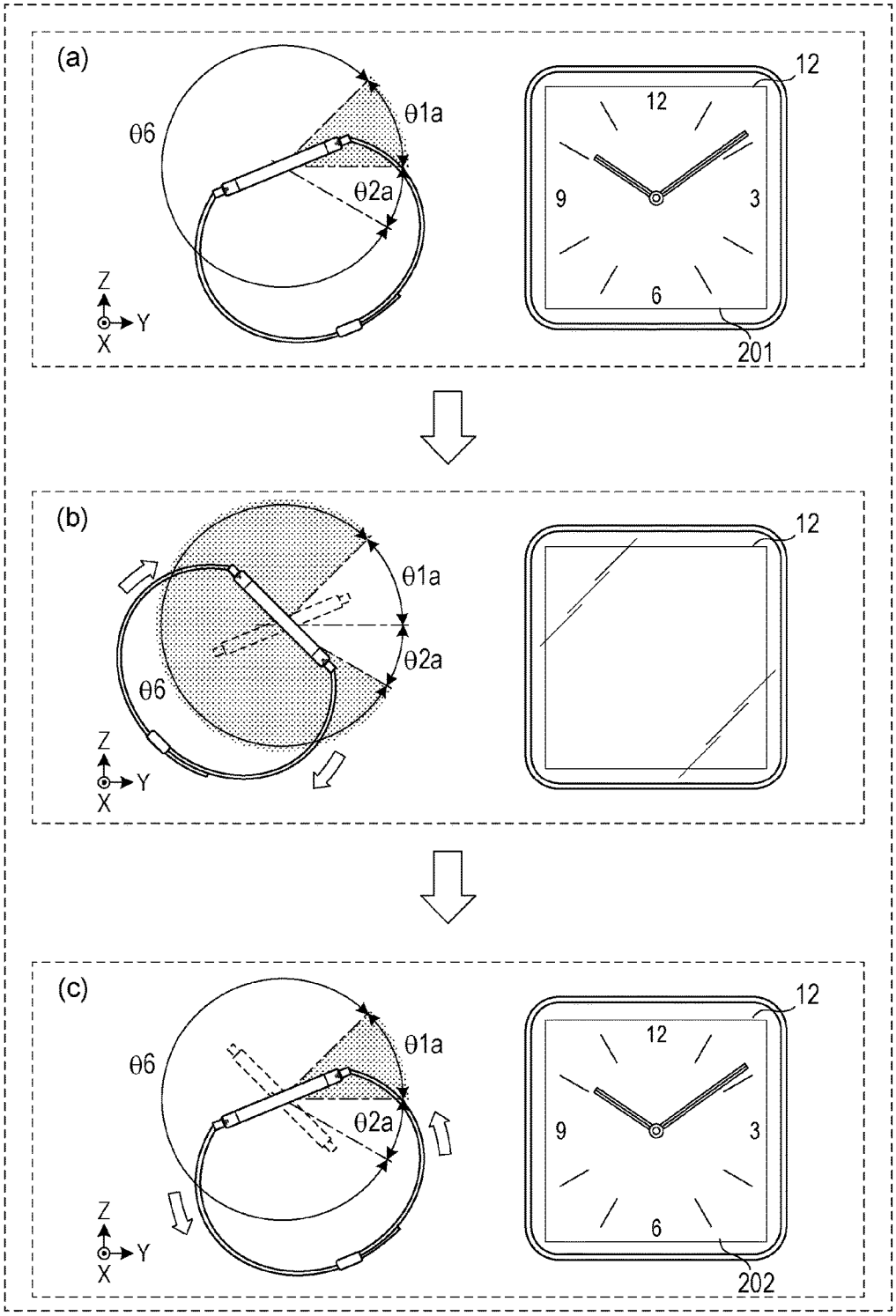
FIG. 18 is a diagram showing a relationship between a display image that is displayed during display control performed by the controller according to Embodiment 2 and the posture of the wearable terminal.

On the other hand, in a case where the controller 112 has determined that the first angle of rotation detected by the sensor 111 has not changed out of the first angle range θ1a into the second angle range θ2a (No in S303), the controller 112 determines whether the first angle of rotation falls within the sixth angle range θ6 (S305), and if the first angle of rotation falls within the sixth angle range θ6 (Yes in S305), the controller 112 causes the display unit 113 to sleep as shown in (b) of FIG. 18 (S309). In a case where the controller 112 has determined, as a result of the determination of S305, that the first angle of rotation does not fail within the sixth angle range θ6 (No in S305), the controller 112 returns to step S302 and causes the display unit 113 to display the first display image 201, as the first angle of rotation remains within the first angle range θ1a.

After the simultaneous display in step S304, the controller 112 determines whether the first angle of rotation has changed out of the second angle range θ2a into the first angle range θ1a (S306).

In a case where the controller 112 has determined that the first angle of rotation detected by the sensor 111 has changed out of the second angle range θ2a into the first angle range θ1a (Yes in S306), the controller 112 causes the display unit 113 to display the second display image 202 in the display area 12 and does not cause the display unit 113 to display the first display image 201 in the display area 12 as shown in (c) of FIG. 17 (S308).

On the other hand, in a case where the controller 112 has determined that the first angle of rotation detected by the sensor 111 has not changed out of the second angle range θ2a into the first angle range θ1a (No in S306), the controller 112 determines whether the first angle of rotation falls within the sixth angle range θ6 (S307), and if the first angle of rotation falls within the sixth angle range θ6 (Yes in S307), the controller 112 causes the display unit 113 to sleep (S309). In a case where the controller 112 has determined, as a result of the determination of S307, that the first angle of rotation does not fall within the sixth angle range θ6 (No in S307), the controller 112 continues the simultaneous display, as the first angle of rotation remains within the second angle range θ2a.

As described above, the controller 112 determines an angle range with the first direction of rotation as the direction of rotation about the Y axis. Alternatively, the controller 112 can also bring about similar advantageous effects by determining an angle range with the first direction of rotation as the direction of rotation about the X axis.

It should be noted that, as shown in (a) to (c) of FIG. 18, a sleep state is brought about in a case where a shift is made from the first angle range v1a to the sixth angle range θ6, and the first display image is displayed even in a case where a shift is made to the first angle range θ1a. In so doing, the second angle range θ2a may be temporarily passed through in the process of shifting from the first angle range θ1a to the sixth angle range θ6. However, even in such a case, not the second display image but the first display image is displayed. In the case of such a state, the user is unlikely to have the intention to cause the second display image to be displayed, and there is a high possibility that the user might have happened to pass through the second angle range θ2a in the process of bringing about a sleep state. Therefore, by displaying not the second display image but the first display image in such a case where return to the first angle range θ1a is made again after a sleep state is brought about once, the user can be prevented from unintentionally switching display images.

OTHER EMBODIMENTS

Although, in the embodiment described above, the controller 112 performs simultaneous display by determining, as a trigger, within which angle range the first angle of rotation of the wearable terminal 100 falls, this does not imply any limitation. For example, a myoelectric sensor that detects a person's handgrip of the wearable terminal may be provided in advance as the sensor, and simultaneous display may be performed according to a result of detection performed by the myoelectric sensor. Specifically, the simultaneous display may be performed when a handgrip has been detected. Further, if the first angle of rotation of the wearable terminal 100 falls within a predetermined angle range in a state where a handgrip has been detected, switching from the first display image to the second display image or a skip from one music track to another by the music player may be performed.

Further, wireless cooperation with an external terminal may allow simultaneous display to be performed when a predetermined operation has been performed on the external terminal. A possible example of the external terminal is a ring-shaped terminal. The ring-shaped terminal includes an acceleration sensor and a triaxial angular velocity sensor and can detect a gesture. Thus, simultaneous display may be performed by using, as a trigger, a gesture detected by the external terminal. Further, the ring-shaped terminal may include a button that accepts an input, and if the first angle of rotation of the wearable terminal 100 falls within a predetermined angle range in a state where the button has been pressed, switching from the first display image to the second display image or a skip from one music track to another by the music player may be performed.

It should be noted that, in each of the embodiments described above, each constituent element may be constituted by dedicated hardware or may be achieved by executing a software program suited to that constituent element. Each constituent element may be achieved by a program executer such as a CPU or a processor reading out and executing a software program stored in a storage medium such as a hard disk or a semiconductor memory. Note here that software by which a display control method according to each of the embodiments described above is achieved may be the following software.

This program causes a computer to execute a method for display control of a wearable terminal including: a display unit that performs display in a display area; a sensor that detects a first angle of rotation of the display unit in a first direction of rotation; and a controller that controls display on the display unit, wherein simultaneous display is performed in which the display unit displays a first display image in a case where the first angle of rotation detected by the sensor falls within a first angle range and at least part of the first display image and at least part of a second display image that is different from the first display image are simultaneously displayed in the display area in a case where the first angle of rotation detected by the sensor has changed out of the first angle range into a second angle range that does not overlap the first angle range.

The wearable terminal according to one or more aspects of the present disclosure has been described above on the basis of the embodiment. However, the present disclosure is not limited to this embodiment. Various modifications to the present embodiment that a person skilled in the art can conceive of and forms that are built by combining constituent elements in different embodiments may be encompassed in the scope of one or more aspects of the present disclosure, provided such modifications and forms do not depart front the spirit of the present disclosure.

The present disclosure is useful as a wearable terminal or the like that allows the user to know how he/she should rotate the wearable terminal to switch to the next display image.

What is claimed is:

[1. A wearable terminal that is wearable on a forearm of a user, comprising:

a body having a display that performs display in a display area, a sensor that detects a first angle of rotation by which the display has been rotated with respect to a first axis as an axis of rotation, and a controller that controls the display according to the first angle of rotation; and a band that is connected to the body and extends around the forearm in an arcuate shape, wherein the first axis is perpendicular to a second axis and is parallel to a direction in which the forearm extends, the first axis forms, with the second axis, a plane that is parallel to a display surface of the display when the wearable terminal on the forearm of the user, when the first angle of rotation is within a first angle range, the controller causes a first display image to be displayed in the display area, and when the first angle of rotation changes from the first angle range to a second angle range that does not overlap with the first angle range, the controller causes at least part of the first display image and at least part of a second display image, that is different from the first display image, to be simultaneously displayed in the display area.]

[2. The wearable terminal according to claim 1, wherein, when after the at least part of the first display image and the at least part of the second display image have been simultaneously displayed in the display area, the first angle of rotation changes from the second angle range to an angle range that does not overlap the second angle range, the controller causes the second display image to be displayed in the display area and the first display image to not be displayed in the display area.]

[3. The wearable terminal according to claim 1, wherein, when after the at least part of the first display image and the at least part of the second display image have been simultaneously displayed in the display area, the first angle of rotation changes from the second angle range to the first angle range, the controller causes the second display image to be displayed in the display area and the first display image to not be displayed in the display area.]

[4. The wearable terminal according to claim 1, wherein the first display image represents a first application that is executable in the wearable terminal, and the second display image represents a second application that is different from the first application and is executable in the wearable terminal.]

[5. The wearable terminal according to claim 1, wherein the sensor further detects a second angle of rotation by which the display has been rotated with respect to the second axis as an axis of rotation, the controller further controls the display according to the second angle of rotation, when the second angle of rotation is within a third angle range and the first angle of rotation is within the first angle range, the controller causes the first display image to be displayed in the display area, and when the second angle of rotation is within the third angle range and the first angle of rotation changes from the first angle range to the second angle range, the controller causes the at least part of the first display image and the at least part of the second display image, that is different from the first display image, to be simultaneously displayed in the display area.]

[6. The wearable terminal according to claim 1, wherein the sensor is a triaxial angular velocity sensor that further detects a third angle of rotation by which the display has been rotated with respect to a third axis as an axis of rotation, the third axis being perpendicular to the first axis and the second axis.]

[7. The wearable terminal according to claim 1, wherein the first angle range is between −15 and 15 degrees when the display surface is assumed to be at 0 degrees when the display surface is parallel to a plane perpendicular to a direction of gravitational force and faces in a direction opposite to the direction of gravitational force, the second angle range is between 15 degrees and 45 degrees when the display surface is assumed to be at 0 degrees when the display surface is parallel to a plane perpendicular to the direction of gravitational force and faces in a direction opposite to the direction of gravitational force and a positive direction of rotation is a direction in which forearm of the user turns so that the display surface faces farther away from the user's body, and the third angle range is between 0 and 45 degrees when the display surface is assumed to be at 0 degrees when the display surface is parallel to a plane perpendicular to the direction of gravitational force and faces in a direction opposite to the direction of gravitational force and the positive direction of rotation is a direction in which the forearm of the user twists so that the display surface faces closer to the user's body.]

[8. The wearable terminal according to claim 1, wherein the controller turns off display on the display when the second angle of rotation changes to an angle range that does not overlap the third angle range.]

[9. The wearable terminal according to claim 1, wherein the second angle range includes a fourth angle range and a fifth angle range and an angle of rotation from the fourth angle range to the first angle range is smaller than an angle of rotation from the fifth angle range to the first angle range, when the first angle of rotation changes from the fifth angle range to the first angle range, the controller causes the second display image to be displayed in the display area and the first display image to not be displayed in the display area, and when the first angle of rotation changes from the fourth angle range to the first angle range, the controller causes the first display image to be displayed in the display area and the second display image to not be displayed in the display area.]

[10. The wearable terminal according to claim 9, wherein when the first angle of rotation changes from the fourth angle range to the fifth angle range, the at least part of the first display image and the at least part of the second display image are simultaneously displayed in the display area and a third display image, suggesting switching from the first display image to the second display image, is displayed in the display area.]

[11. The wearable terminal according to claim 1, wherein when the at least part of the first display image and the at least part of the second display image are simultaneously displayed in the display area and when the first angle of rotation is within the second angle range, the controller causes the at least part of the second display image to be displayed in a first display region of the display area and causes at least part of the first display image to be displayed in a second display region of the display area, the display area is divided into to two regions by a boundary line that is perpendicular to the first axis, the first display region is one of the two regions which is facing towards a body of the user, and the second display region is the other of the two regions which is facing away from a body of the user.]

[12. The wearable terminal according to claim 1, wherein when the at least part of the first display image and the at least part of the second display image are simultaneously displayed in the display area and when the first angle of rotation is within the second angle range, the controller causes the at least part of the first display image to be displayed in a first display region of the display area and causes at least part of the second display image to be displayed in a second display region of the display area, the display area is divided into the two regions by a boundary line that is parallel to the first axis, the first display region is one of the two regions which is located on a fingertip side of the user, and the second display area is the other of the two areas which is located on an elbow side of the user.]

13. A wearable terminal that is wearable on a forearm of a user, comprising:

a body having a display that performs display in a display area, a sensor that detects a first angle of rotation by which the display has been rotated with respect to a first axis as an axis of rotation, the first axis being parallel to a direction in which the forearm extends, and a controller that controls the display according to the first angle of rotation; and a band that is connected to the body and extends around the forearm *in* an arcuate shape *when worn on the forearm of the user*, wherein, when the first angle of rotation is within a first angle range, the controller causes a first display image to be displayed in the display area, [and]

when the first angle of rotation changes from the first angle range to a second angle range that does not overlap the first angle range, the controller causes at least part of the first display image and at least part of a second display image, that is different from the first display image, to be simultaneously displayed in the display area, *and*

*the controller causes part of the first display image to be slid out from the display area while causing part of the second display image to be slid into the display area, when performing a screen transition from a first screen, in which the first display image is displayed, to a*

*second screen, in which the rest of the first display image and the part of the second display image are simultaneously displayed.*

14. The wearable terminal according to claim 13, wherein, when after the at least part of the first display image and the at least part of the second display image have been simultaneously displayed in the display area, the first angle of rotation changes from the second angle range to an angle range that does not overlap the second angle range, the controller causes the second display image to be displayed in the display area and the first display image to not be displayed in the display area.

15. The wearable terminal according to claim 13, wherein, when after the at least part of the first display image and the at least part of the second display image have been simultaneously displayed in the display area, the first angle of rotation changes from the second angle range to the first angle range, the controller causes the second display image to be displayed in the display area and the first display image to not be displayed in the display area.

16. The wearable terminal according to claim 13, wherein the first display image represents a first application that is executable in the wearable terminal, and the second display image represents a second application that is different from the first application and is executable in the wearable terminal.

17. The wearable terminal according to claim 13, wherein the sensor further detects a second angle of rotation by which the display has been rotated with respect to a second axis as an axis of rotation, the second axis is perpendicular to the first axis and forms, with the first axis, a plane that is parallel to a display surface of the display when the user is wearing the wearable terminal on the forearm, the controller further controls the display according to the second angle of rotation, when the second angle of rotation is within a third angle range and the first angle of rotation is within the first angle range, the controller causes the first display image to be displayed in the display area, and when the second angle of rotation is within the third angle range and the first angle of rotation changes from the first angle range to the second angle range, the controller causes the at least part of the first display image and the at least part of the second display image, that is different from the first display image, to be simultaneously displayed in the display area.

18. The wearable terminal according to claim 13, wherein the sensor is a triaxial angular velocity sensor that further detects a [third] *further* angle of rotation by which the display has been rotated with respect to a [third] *further* axis as an axis of rotation, the [third] *further* axis being perpendicular to the first axis and the second axis.

19. The wearable terminal according to claim [18] *17*, wherein the first angle range is between −15 degrees and 15 degrees when the display surface of the display is assumed to be at 0 degrees when the display surface is parallel to a plane perpendicular to a direction of gravitational force and faces in a direction opposite to the direction of gravitational force, the second angle range is between 15 degrees and 45 degrees when the display surface is assumed to be at 0 degrees when the display surface is parallel to a plane perpendicular to the direction of gravitational force and faces in a direction opposite to the direction of gravitational force and a positive direction of rotation is a direction in which the forearm of the user turns so that the display surface faces farther away from the user's body, and the third angle range is between 0 degree and 45 degrees when the display surface is assumed to be at 0 degrees when the display surface is parallel to a plane perpendicular to the direction of gravitational force and faces in a direction opposite to the direction of gravitational force and the positive direction of rotation is a direction in which the forearm of the user twists so that the display surface faces closer to the user's body.

20. The wearable terminal according to claim [18] *17*, wherein the controller turns off display on the display when the second angle of rotation changes to an angle range that does not overlap the third angle range.

21. The wearable terminal according to claim 13, wherein the second angle range includes a [fourth] *first* angle *sub* range and a [fifth] *second* angle *sub* range and an angle of rotation from the [fourth] *first* angle *sub* range to the first angle range is smaller than an angle of rotation from the [fifth] *second* angle *sub* range to the first angle range, when the first angle of rotation changes from the [fifth] *second* angle *sub* range to the first angle range, the controller causes the second display image to be displayed in the display area and the first display image to not be displayed in the display area, and when the first angle of rotation changes from the [fourth] *first* angle *sub* range to the first angle range, the controller causes the first display image to be displayed in the display area and the second display image to not be displayed in the display area.

22. The wearable terminal according to claim 21, wherein when the first angle of rotation changes from the [fourth] *first* angle *sub* range to the [fifth] *second* angle *sub* range, the at least part of the first display image and the at least part of the second display image are simultaneously displayed in the display area and a third display image suggesting switching from the first display image to the second display image is displayed in the display area.

23. The wearable terminal according to claim 13, wherein when the at least part of the first display image and the at least part of the second display image are simultaneously displayed in the display area and when the first angle of rotation is within the second angle range, the controller causes the at least part of the second display image to be displayed in a first display region of the display area and causes at least part of the first display image to be displayed in a second display region of the display area, the display area is divided into to two regions by a boundary line parallel to the forearm *when the band is worn on the forearm of the user*, the first display region is one of the two regions which is located on a fingertip side of the user *when the band is worn on the forearm of the user*, and the second display region is the other of the two regions which is located on an elbow side of the user *when the band is worn on the forearm of the user*.

24. The wearable terminal according to claim 13, wherein when the at least part of the first display image and the at least part of the second display image are simultaneously displayed in the display area and when the first angle of rotation is within the second angle range, the controller causes the at least part of the first display image to be displayed in a first display region of the display area and causes at least part of the second display image to be displayed in a second display region of the display area, the display area is divided into the two regions by a boundary line that is [parallel] *perpendicular* to the forearm *when the band is worn on the forearm of the user*, the first display region is one of the two regions which is located on a fingertip side of the user *when the band is worn on the forearm of the user*, and the second display area is the other of the two areas which is located on an elbow side of the user *when the band is worn on the forearm of the user*.

25. The wearable terminal according to claim 13, when, after the first angle of rotation changes from the second angle range into a [sixth] *further* angle range that does not overlap the first angle range or the second angle range, the first angle of rotation changes from the [sixth] *further* angle range to the first angle range, the controller causes the first display image to be displayed in the display area and the second display image to not be displayed in the display area.

26. The wearable terminal according to claim 13, wherein the second angle range is an angle range between the first angle range and the [sixth] *further* angle range.

[27. A control method for wearable terminal that is wearable on a forearm of a user, the wearable terminal including:

a body having a display that performs display in a display area, a sensor that detects a first angle of rotation by which the display has been rotated with respect to a first axis as an axis of rotation, and a controller that controls the display according to the first angle of rotation; and a band that is connected to the body and extends around the forearm in an arcuate shape, wherein the first axis is perpendicular to a second axis and is parallel to a direction in which the forearm extends, the first axis forms, with the second axis, a plane that is parallel to a display surface of the display when the wearable terminal is on the forearm of the user, the method comprising:

when the first angle of rotation is within a first angle range, causing a first display image to be displayed in the display area, and when the first angle of rotation changes from the first angle range to a second angle range that does not overlap with the first angle range, causing at least part of the first display image and at least part of a second display image, that is different from the first display image, to be simultaneously displayed in the display area.]

28. A control method for a wearable terminal that is wearable on a forearm of a user, the wearable terminal including:

a body having a display that performs display in a display area, a sensor that detects a first angle of rotation by which the display has been rotated with respect to a first axis as an axis of rotation, the first axis being parallel to a direction in which the forearm extends, and a controller that controls the display according to the first angle of rotation; and a band that is connected to the body and extends around the forearm in an arcuate shape *when worn on the forearm of the user*, the method comprising:

when the first angle of rotation is within a first angle range, causing a first display image to be displayed in the display area, [and]

when the first angle of rotation changes from the first angle range to a second angle range that does not overlap with the first angle range, causing at least part of the first display image and at least part of a second display image, that is different from the first display image, to be simultaneously displayed in the display area, *and*

*causing part of the first display image to be slid out from the display area while causing part of the second display image to be slid into the display area, when performing a screen transition from a first screen, in which the first display image is displayed, to a second screen, in which the rest of the first display image and the part of the second display image are simultaneously displayed.*

*29. The wearable terminal according to claim 13, wherein the first display image and the second display image are slid in a direction in which the display has been rotated.*

*30. The control method according to claim 28, wherein, in the screen transition, the first display image and the second display image are slid in a direction in which the display has been rotated.*

*31. The control method according to claim 28, further comprising:*

*causing the second display image to be displayed in the display area and the first display image to not be displayed in the display area, when after the at least part of the first display image and the at least part of the second display image have been simultaneously displayed in the display area, the first angle of rotation changes from the second angle range to an angle range that does not overlap the second angle range.*

*32. The control method according to claim 28, further comprising:*

*causing the second display image to be displayed in the display area and the first display image to not be displayed in the display area, when after the at least part of the first display image and the at least part of the second display image have been simultaneously displayed in the display area, the first angle of rotation changes from the second angle range to the first angle range.*

*33. The control method according to claim 28, wherein the first display image represents a first application that is executable in the wearable terminal, and*

*the second display image represents a second application that is different from the first application and is executable in the wearable terminal.*

*34. A wearable terminal that is wearable on a forearm of a user, comprising:*

*a body having a display that performs display in a display area, a sensor that detects a first angle of rotation by which the display has been rotated with respect to a first axis as an axis of rotation, the first axis being parallel to a direction in which the forearm extends, and a controller that controls the display according to the first angle of rotation; and*

*a band that is connected to the body and extends around the forearm in an arcuate shape when worn on the forearm of the user,*

*wherein, when the first angle of rotation is within a first angle range, the controller causes a first display image to be displayed in the display area,*

*when the first angle of rotation changes from the first angle range to a second angle range that does not overlap the first angle range, the controller causes at least part of the first display image and at least part of a second display image, that is different from the first display image, to be simultaneously displayed in the display area, and*

*when after the at least part of the first display image and the at least part of the second display image have been simultaneously displayed in the display area, the first angle of rotation changes from the second angle range to an angle range that does not overlap the second angle range, the controller causes the second display image to be displayed in the display area and the first display image to not be displayed in the display area.*

*35. The wearable terminal according to claim 34, wherein the first display image represents a first application that is executable in the wearable terminal, and*

*the second display image represents a second application that is different from the first application and is executable in the wearable terminal.*

*36. A wearable terminal that is wearable on a forearm of a user, comprising:*

*a body having a display that performs display in a display area, a sensor that detects a first angle of rotation by which the display has been rotated with respect to a first axis as an axis of rotation, the first axis being parallel to a direction in which the forearm extends, and a controller that controls the display according to the first angle of rotation; and*

*a band that is connected to the body and extends around the forearm in an arcuate shape when worn on the forearm of the user,*

*wherein, when the first angle of rotation is within a first angle range, the controller causes a first display image to be displayed in the display area,*

*when the first angle of rotation changes from the first angle range to a second angle range that does not overlap the first angle range, the controller causes at least part of the first display image and at least part of a second display image, that is different from the first display image, to be simultaneously displayed in the display area, and*

*when after the at least part of the first display image and the at least part of the second display image have been simultaneously displayed in the display area, the first angle of rotation changes from the second angle range to the first angle range, the controller causes the second display image to be displayed in the display area and the first display image to not be displayed in the display area.*

*37. The wearable terminal according to claim 35, wherein the first display image represents a first application that is executable in the wearable terminal, and*

*the second display image represents a second application that is different from the first application and is executable in the wearable terminal.*

* * * * *